US012609582B2

(12) United States Patent
Nagahama et al.

(10) Patent No.: US 12,609,582 B2
(45) Date of Patent: Apr. 21, 2026

(54) POWER TOOL

(71) Applicant: MAKITA CORPORATION, Anjo (JP)

(72) Inventors: Tatsuya Nagahama, Anjo (JP); Junya Inuzuka, Anjo (JP); Takashi Momose, Anjo (JP)

(73) Assignee: MAKITA CORPORATION, Anjo (JP)

( * ) Notice: Subject to any disclaimer, the term of this patent is extended or adjusted under 35 U.S.C. 154(b) by 307 days.

(21) Appl. No.: 18/397,480

(22) Filed: Dec. 27, 2023

(65) Prior Publication Data

US 2024/0128834 A1 Apr. 18, 2024

Related U.S. Application Data

(62) Division of application No. 18/207,711, filed on Jun. 9, 2023, now Pat. No. 12,341,406, which is a division (Continued)

(30) Foreign Application Priority Data

Sep. 11, 2013 (JP) ................................. 2013-188528

(51) Int. Cl.
*H02K 3/32* (2006.01)
*B25F 5/00* (2006.01)
(Continued)

(52) U.S. Cl.
CPC .............. *H02K 7/145* (2013.01); *B25F 5/02* (2013.01); *H02K 3/28* (2013.01); *H02K 3/522* (2013.01);
(Continued)

(58) Field of Classification Search
CPC ...... H02K 7/145; H02K 11/215; H02K 11/27; H02K 3/28; H02K 3/522; H02K 5/04;
(Continued)

(56) References Cited

U.S. PATENT DOCUMENTS

| | | | |
|---|---|---|---|
| 3,135,881 A | 6/1964 | Alexis |
| 3,979,615 A | 9/1976 | Neff |

(Continued)

FOREIGN PATENT DOCUMENTS

| | | | |
|---|---|---|---|
| CN | 1507378 A | 6/2004 |
| CN | 102403815 A | 4/2012 |

(Continued)

OTHER PUBLICATIONS

Office Action mailed Dec. 9, 2024, in related U.S. Appl. No. 18/207,711, and examined claims 21-36.

(Continued)

*Primary Examiner* — Burton S Mullins

(74) *Attorney, Agent, or Firm* — J-TEK LAW PLLC; Jeffrey D. Tekanic; Scott T. Wakeman

(57) ABSTRACT

A power tool includes a housing formed of two half-housings and an end cap. A stator is mounted in the housing, and a rotor including a rotor core and a permanent magnet is mounted in the stator core. A rotary shaft having an axis of rotation extending in a front-rear direction supports the rotor core. Insulators are mounted at front and rear axial ends of the stator core, a planetary gear is mounted forward of the rotor core and a handle extends from the housing. The front insulator includes two recesses, and a first portion of each recess opens radially and a second portion of each recess opens axially rearward. Portions of the stator core cover the recesses, and projections extend from the housing and respectively mate with the recesses.

10 Claims, 24 Drawing Sheets

Related U.S. Application Data of application No. 17/122,601, filed on Dec. 15, 2020, now Pat. No. 11,715,995, which is a division of application No. 15/919,615, filed on Mar. 13, 2018, now Pat. No. 10,903,718, which is a division of application No. 14/481,237, filed on Sep. 9, 2014, now Pat. No. 9,948,162.

(51) Int. Cl.

| | |
|---|---|
| *B25F 5/02* | (2006.01) |
| *H02K 3/28* | (2006.01) |
| *H02K 3/34* | (2006.01) |
| *H02K 3/52* | (2006.01) |
| *H02K 5/04* | (2006.01) |
| *H02K 5/22* | (2006.01) |
| *H02K 7/116* | (2006.01) |
| *H02K 7/14* | (2006.01) |
| *H02K 11/215* | (2016.01) |
| *H02K 11/27* | (2016.01) |
| *H02K 29/08* | (2006.01) |

(52) U.S. Cl.
CPC .............. *H02K 5/04* (2013.01); *H02K 5/225* (2013.01); *H02K 7/116* (2013.01); *H02K 11/215* (2016.01); *H02K 11/27* (2016.01); *H02K 29/08* (2013.01); *B25F 5/00* (2013.01); *H02K 2203/03* (2013.01); *H02K 2203/09* (2013.01)

(58) Field of Classification Search
CPC ........ H02K 5/225; H02K 7/116; H02K 29/00; H02K 3/32; H02K 3/34; H02K 3/345; B25F 5/02
See application file for complete search history.

(56) References Cited

U.S. PATENT DOCUMENTS

| | | | |
|---|---|---|---|
| 4,132,460 A | 1/1979 | Porta | |
| 4,161,669 A | 7/1979 | Aimar | |
| 4,287,446 A | 9/1981 | Lill et al. | |
| 5,103,127 A | 4/1992 | Peter | |
| 5,170,851 A | 12/1992 | Kress et al. | |
| 6,800,973 B2 | 10/2004 | Futami et al. | |
| 6,822,364 B2 | 11/2004 | Suzuki et al. | |
| 6,993,829 B2 | 2/2006 | Kobayashi et al. | |
| 7,215,052 B2 | 5/2007 | Blase et al. | |
| 7,235,905 B2 | 6/2007 | Matsubara et al. | |
| 7,247,962 B2 | 7/2007 | Burgbacher | |
| 7,268,459 B2 | 9/2007 | Baba et al. | |
| 7,388,312 B2 | 6/2008 | Hyodo et al. | |
| 7,663,277 B2 | 2/2010 | Kinoshita et al. | |
| 7,663,285 B2 | 2/2010 | Yumoto et al. | |
| 7,719,157 B2 | 5/2010 | Yukitake | |
| 8,018,104 B2 | 9/2011 | Yagai et al. | |
| 8,035,263 B2 | 10/2011 | Kienzler et al. | |
| 8,193,677 B2 | 6/2012 | Murakami et al. | |
| 8,253,285 B2 | 8/2012 | Yoshida et al. | |
| 8,421,282 B2 | 4/2013 | Ota | |
| 8,810,085 B2 | 8/2014 | Matsunaga et al. | |
| 8,952,581 B2 | 2/2015 | Naito et al. | |
| 10,491,072 B2 * | 11/2019 | Kitamura | ................. H02K 3/34 |
| 2002/0057067 A1 | 5/2002 | Steinbrink | |
| 2003/0163924 A1 | 9/2003 | Hempe et al. | |
| 2006/0175913 A1 | 8/2006 | Hempe et al. | |
| 2007/0296292 A1 | 12/2007 | Kienzler et al. | |
| 2009/0058215 A1 | 3/2009 | Murakami et al. | |
| 2010/0019592 A1 | 1/2010 | Altindis | |
| 2010/0244592 A1 | 9/2010 | Oomori et al. | |
| 2011/0043057 A1 | 2/2011 | Ota | |

| | | | |
|---|---|---|---|
| 2011/0171887 A1 | 7/2011 | Tanimoto et al. | |
| 2011/0180286 A1 | 7/2011 | Oomori et al. | |
| 2012/0014065 A1 | 1/2012 | Haga et al. | |
| 2012/0098379 A1 | 4/2012 | Yamaguchi | |
| 2012/0169163 A1 | 7/2012 | Imai et al. | |
| 2012/0242186 A1 | 9/2012 | Hattori | |
| 2012/0262014 A1 | 10/2012 | Katou et al. | |
| 2012/0286593 A1 | 11/2012 | Yokogawa et al. | |
| 2012/0319508 A1 | 12/2012 | Oomori | |
| 2013/0033134 A1 | 2/2013 | Naito et al. | |
| 2013/0162098 A1 | 6/2013 | Furuhashi et al. | |
| 2013/0207491 A1 | 8/2013 | Hatfield et al. | |
| 2013/0313927 A1 | 11/2013 | Laber et al. | |
| 2014/0062249 A1 | 3/2014 | Nagao et al. | |
| 2015/0069864 A1 | 3/2015 | Nagahama et al. | |
| 2018/0205288 A1 | 7/2018 | Nagahama et al. | |

FOREIGN PATENT DOCUMENTS

| | | | | |
|---|---|---|---|---|
| DE | 102008006399 A1 | 8/2008 | | |
| EP | 1372250 A2 | 12/2003 | | |
| EP | 2139098 A2 | 12/2009 | | |
| JP | H06233483 A | 8/1994 | | |
| JP | 2002281723 A | 9/2002 | | |
| JP | 2005341640 A | 12/2005 | | |
| JP | 2007330065 A | * 12/2007 | ............... | B25F 5/00 |
| JP | 2009056867 A | 3/2009 | | |
| JP | 2010273525 A | 12/2010 | | |
| JP | 2011045201 A | 3/2011 | | |
| JP | 2011094577 A | 5/2011 | | |
| JP | 2012139749 A | 7/2012 | | |
| JP | 2013021824 B | 1/2013 | | |
| JP | 2013031901 A | 2/2013 | | |
| JP | 2013110962 A | 6/2013 | | |
| WO | 03066262 A2 | 8/2003 | | |
| WO | 2009145205 A1 | 12/2009 | | |
| WO | 2011155327 A1 | 12/2011 | | |

OTHER PUBLICATIONS

Examination Report from the European Patent Office dated Jun. 6, 2017 in related EP application No. 14 184 351.6, including grounds for rejection and examined claims 1-15.

Extended European Search Report dated Dec. 9, 2015 in related European patent application No. 14184351.6, including European Search Opinion, European Search Report and examined claims 1-15.

Fourth Office Action from the Chinese Patent Office mailed Feb. 26, 2018 in related Chinese application No. 201410312524, and translation thereof.

Office Action from the Chinese Patent Office mailed May 26, 2016 in related Chinese application No. 201410312524, and translation thereof.

Office Action from the Japanese Patent Office dated Sep. 1, 2015 in counterpart Japanese application No. 2014-236956, and translation thereof.

Office Action from the Japanese Patent Office mailed May 2, 2017 in related Japanese application No. 2013-188528, and translation of substantive portions thereof.

Search Report from the Chinese Patent Office mailed May 26, 2016 in related Chinese application No. 201410312524, and translation thereof.

Second Office Action from the Chinese Patent Office mailed Feb. 3, 2017 in related Chinese application No. 201410312524, and translation thereof.

Supplementary Search Report from the Chinese Patent Office mailed May 22, 2017 in related Chinese application No. 201410312524, and translation thereof.

Third Office Action from the Chinese Patent Office mailed May 31, 2017 in related Chinese application No. 201410312524, and translation thereof.

* cited by examiner

POWER TOOL

CROSS-REFERENCE

The present application is a divisional of U.S. patent application Ser. No. 18/207,711, filed on Jun. 9, 2023, now pending, which is a divisional of U.S. patent application Ser. No. 17/122,601 filed on Dec. 15, 2020, now U.S. Pat. No. 11,715,995, which is a divisional of U.S. patent application Ser. No. 15/919,615 filed on Mar. 13, 2018, now U.S. Pat. No. 10,903,718, which is a divisional of U.S. patent application Ser. No. 14/481,237 filed on Sep. 9, 2014, now U.S. Pat. No. 9,948,162, which claims priority to Japanese patent application serial number 2013-188528 filed on Sep. 11, 2013, the contents of which are incorporated fully herein.

TECHNICAL FIELD

The present invention relates to a power tool, such as a driver-drill, that comprises a motor serving as its drive source.

BACKGROUND ART

As disclosed, e.g., in US 2011/0043057 A1 (and its family member JP 2011-45201 A), power tools equipped with a motor, such as a brushless motor, are well known. However, the overall structure of the electric motor differs depending on the model (e.g., a light load model or a heavy load model) of the power tool.

For example, an electric motor for a light load model typically has a structure wherein the main current flows to a sensor circuit board via a solderable wire. On the other hand, in an electric motor for a heavy load model, lead wires (i.e., power supply wires) are typically directly connected to more robust fusing terminals (connecting terminals) due to the higher current that flows therethrough.

SUMMARY OF THE INVENTION

Although electric motors for light (low) load power tools may have a small size and thus be space saving, generally speaking such electric motors are not capable of drawing (or being driven by) a large current, thereby limiting their applicability. In contrast, while electric motors for heavy (high) load power tools are designed to draw (or be driven by) a large current, such electric motors are generally larger than light load electric motors and consequently are not suitable for making a compact power tool.

Accordingly, it is an object of the present teachings to disclose, for example and without limitation, a compact power tool that utilizes a relatively small-sized motor capable of drawing a large current.

In a first aspect of the present teachings, a power tool preferably comprises a motor that includes a stator and a rotor. A plurality of coils (e.g., at least six) are wound on the stator such that the coils are wound through respective insulators located at the front and rear in an axial direction of the stator. The power tool further comprises a short circuiting means that short circuits diagonally-positioned (diametrically-opposite) pairs of winding wires between the coils, of which there are at least six.

In a second aspect of the present teachings, all of the coils are preferably wound with one winding wire (a single continuous wire).

In addition or in the alternative to the second aspect, the short circuiting means preferably comprises: a plurality of sheet metal elements, which electrically interconnect the pairs of winding wires between the coils (the winding wires that are diametrically opposite of each other), and an insulation part, which is made of resin and retains the sheet metal elements.

In addition or in the alternative to the first and/or the second aspect, the short circuiting means preferably is lead wires that electrically interconnect the pairs of winding wires between the coils.

In addition or in the alternative to any preceding aspect, a sensor circuit board, which comprises a rotation detection device that detects positions of permanent magnets provided on the rotor, is preferably provided between the insulator and the short circuiting means.

The sensor circuit board is preferably mountable at a different phase.

In another aspect of the present teachings, a power tool preferably comprises a motor that includes a stator and a rotor. A plurality of coils are wound on the stator such that the coils are wound through respective insulators located at the front and rear in an axial direction of the stator. A housing that houses the motor is formed by combining a pair of half housings. The stator is provided with at least one positioning part that engages with respective inner surfaces of the half housings.

In another aspect of the present teachings, a power tool preferably comprises a motor that includes a stator and a rotor. A plurality of coils are wound on the stator such that the coils are wound through respective insulators located at the front and rear in an axial direction of the stator. A housing that houses the motor is a tubular housing. The stator is provided with at least one positioning part that engages with an inner surface of the tubular housing.

Either of the above-noted positioning parts may be provided on the insulator(s).

According to the present teachings, a compact power tool can be achieved by using a motor that can draw a large current, even though it is small sized and space saving.

BRIEF DESCRIPTION OF THE DRAWINGS

FIG. 6 provides explanatory diagrams of a representative sensor circuit board, wherein

FIG. 7 provides explanatory diagrams of the brushless motor, wherein

FIG. 9 provides explanatory diagrams of the short circuiting element, wherein

FIG. 20 shows explanatory diagrams of the stator in which the attachment position of the sensor circuit board has been changed, wherein

FIG. 22 shows explanatory diagrams of a modified example of a front insulator, wherein

FIG. 23 shows explanatory diagrams of a modified example of a rear insulator, wherein

DETAILED DESCRIPTION OF THE EMBODIMENTS

Figure 1:
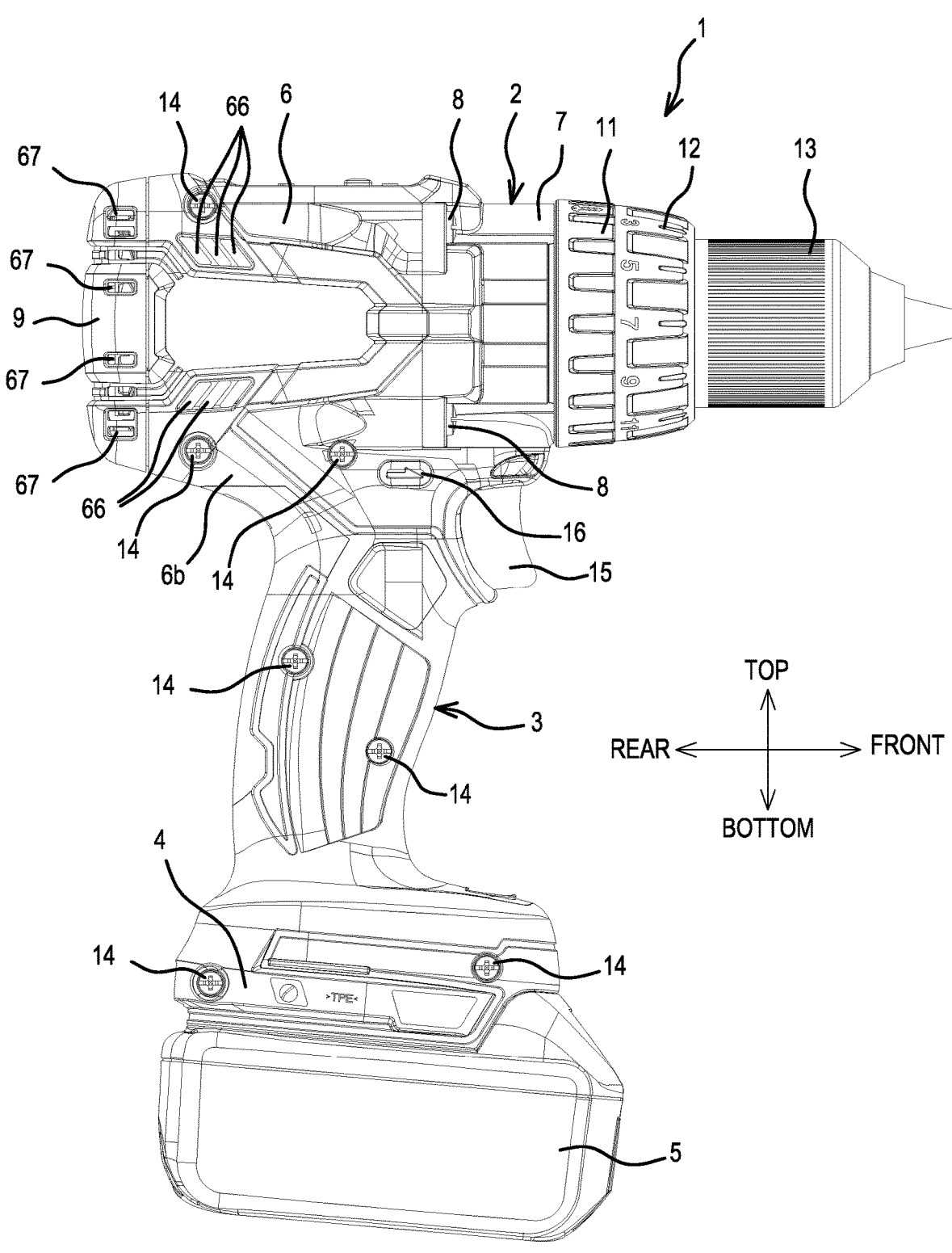
FIG. 1 is an overall view of a driver-drill according to the present teachings.
Figure 2:
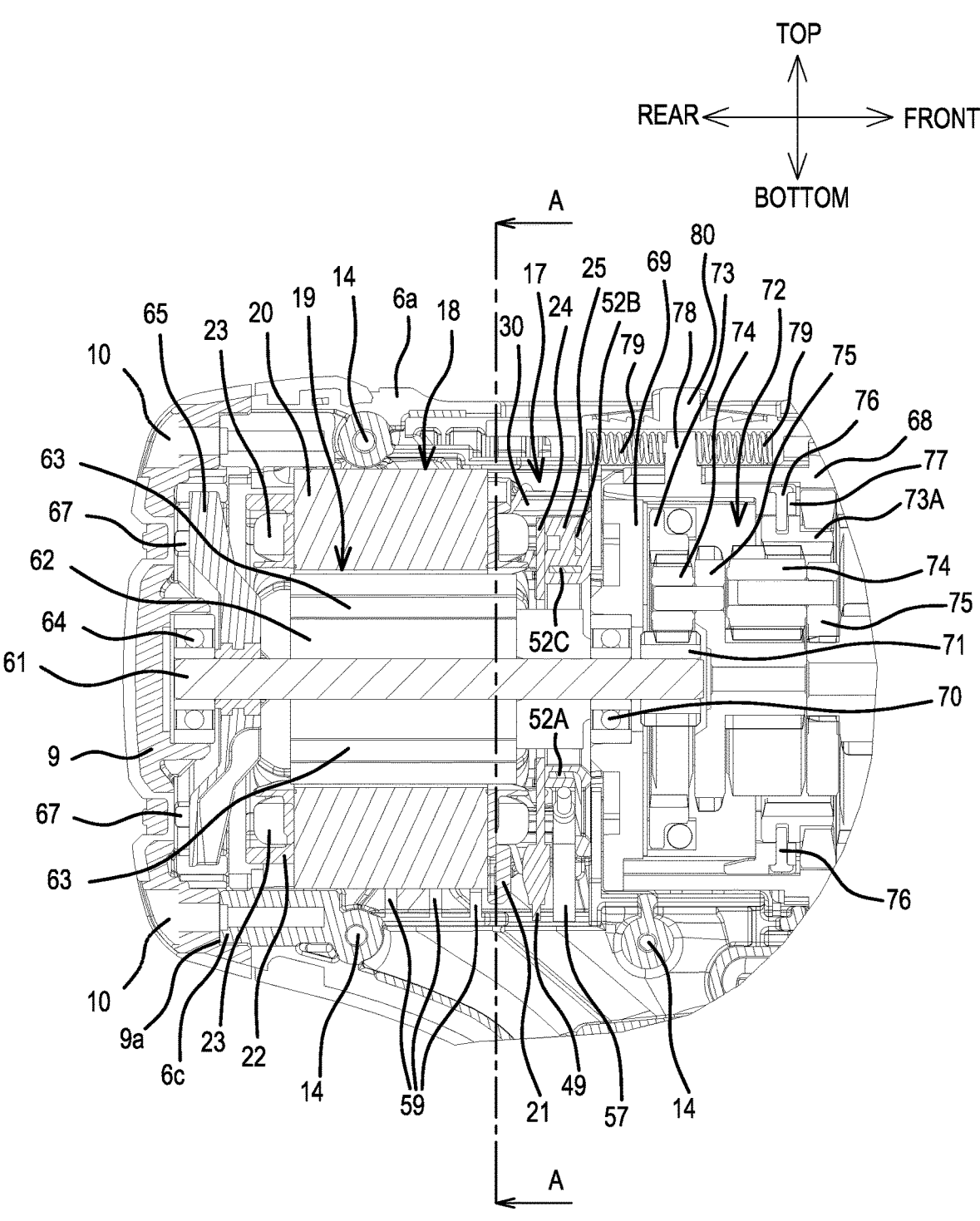
FIG. 2 is a longitudinal cross sectional view of a main body rear part of the driver-drill.

FIG. 1 is an overall view of a driver-drill 1, which serves one representative, non-limiting example of a power tool according to the present teachings. FIG. 2 is a longitudinal cross sectional view of a rear part of a main body 2 of the driver-drill 1. The representative driver-drill 1 has an overall T shape in that a handle 3 extends in a downward (substantially perpendicular) direction from the main body 2, which extends in a rear-front direction. Furthermore, a battery pack 5 constitutes a power supply for the driver-drill 1 and is mounted on a mounting part 4, which is formed at a lower end of the handle 3.

A housing of the main body 2 is formed by assembling (mounting) a front housing 7, which houses (surrounds or encloses, at least substantially) a clutch mechanism and a spindle, onto the front (i.e., the right side in FIG. 1) of a tubular main body housing 6, which houses a brushless motor 17 and a planetary gear speed reducing mechanism 72 that are discussed below, via screws 8 screwed in from the front. Then, a cap housing 9 is assembled (mounted) on the rear of the main body housing 6 via screws 10 at two locations (upper and lower), that are screwed in from the rear. The coupling surfaces between the main body housing 6 and the cap housing 9 form a socket and spigot joint. That is, annular protruding parts 6c, each of which is formed in a rear surface of the main body housing 6 and includes a screw boss into which the corresponding screw 10 is screwed, are mated against recessed parts 9a, which are formed in a front surface of the cap housing 9. A mode changing ring (or action mode changing ring) 11 and a clutch adjusting ring 12 are provided forward of the front housing 7, and a chuck 13, which is mounted on the spindle, is provided forward of the clutch adjusting ring 12. Furthermore, the handle 3 is continuous with the main body housing 6, and these are formed by assembling (attaching) left and right half housings 6a, 6b via screws 14. Reference number is a trigger that is provided on a switch housed in the handle 3. Reference number 16 is a motor forward/reverse changing button (reversing switch lever). A (not shown) light preferably provides illumination forward of the chuck 13 and is preferably disposed above the trigger 15.

Figure 3:
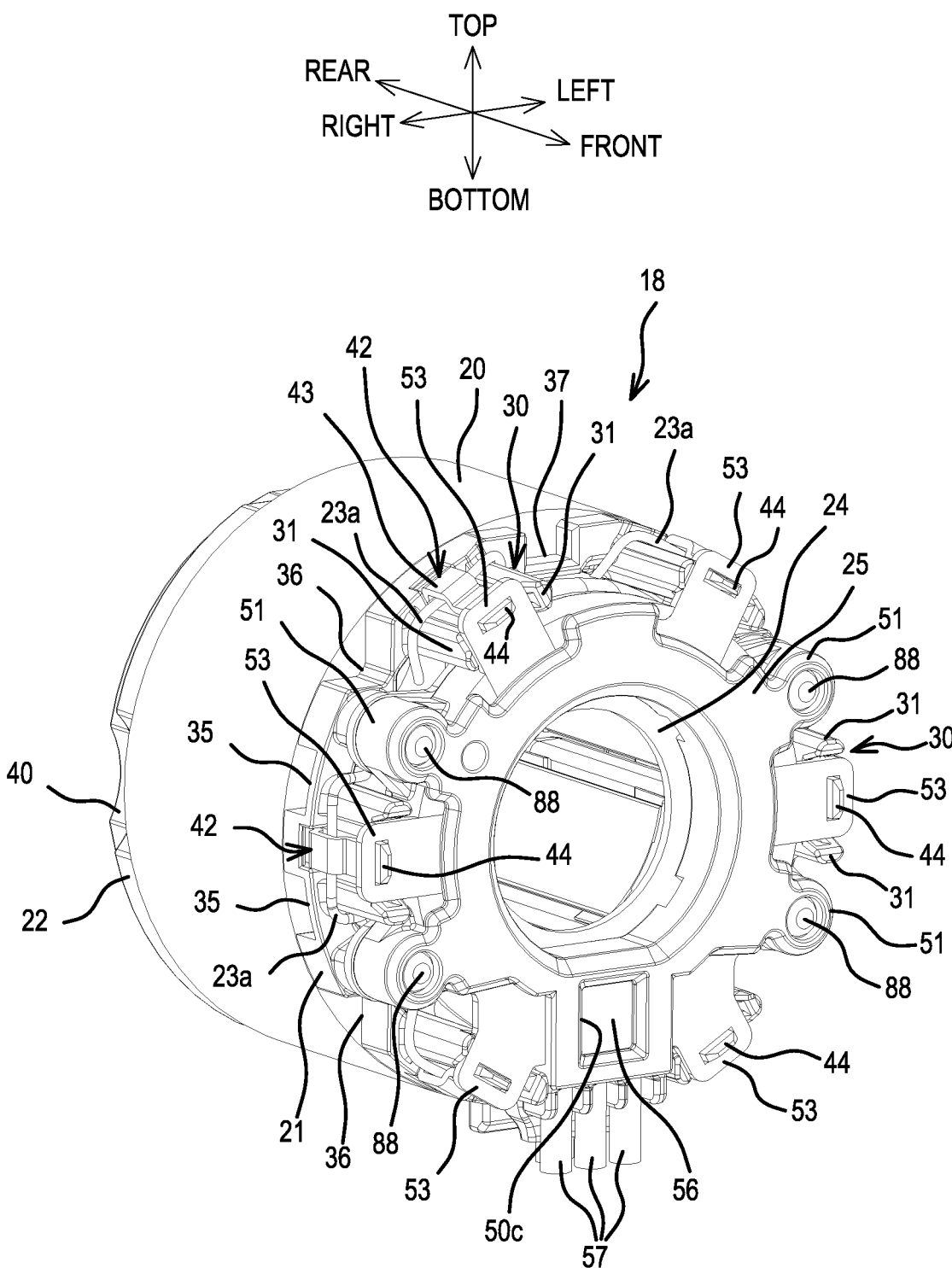
FIG. 3 is a perspective, side view of a representative brushless motor.
Figure 4:
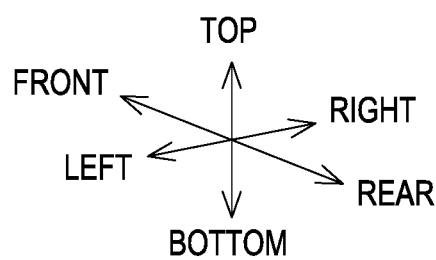
FIG. 4 is a perspective, rear view of the brushless motor.
Figure 4:
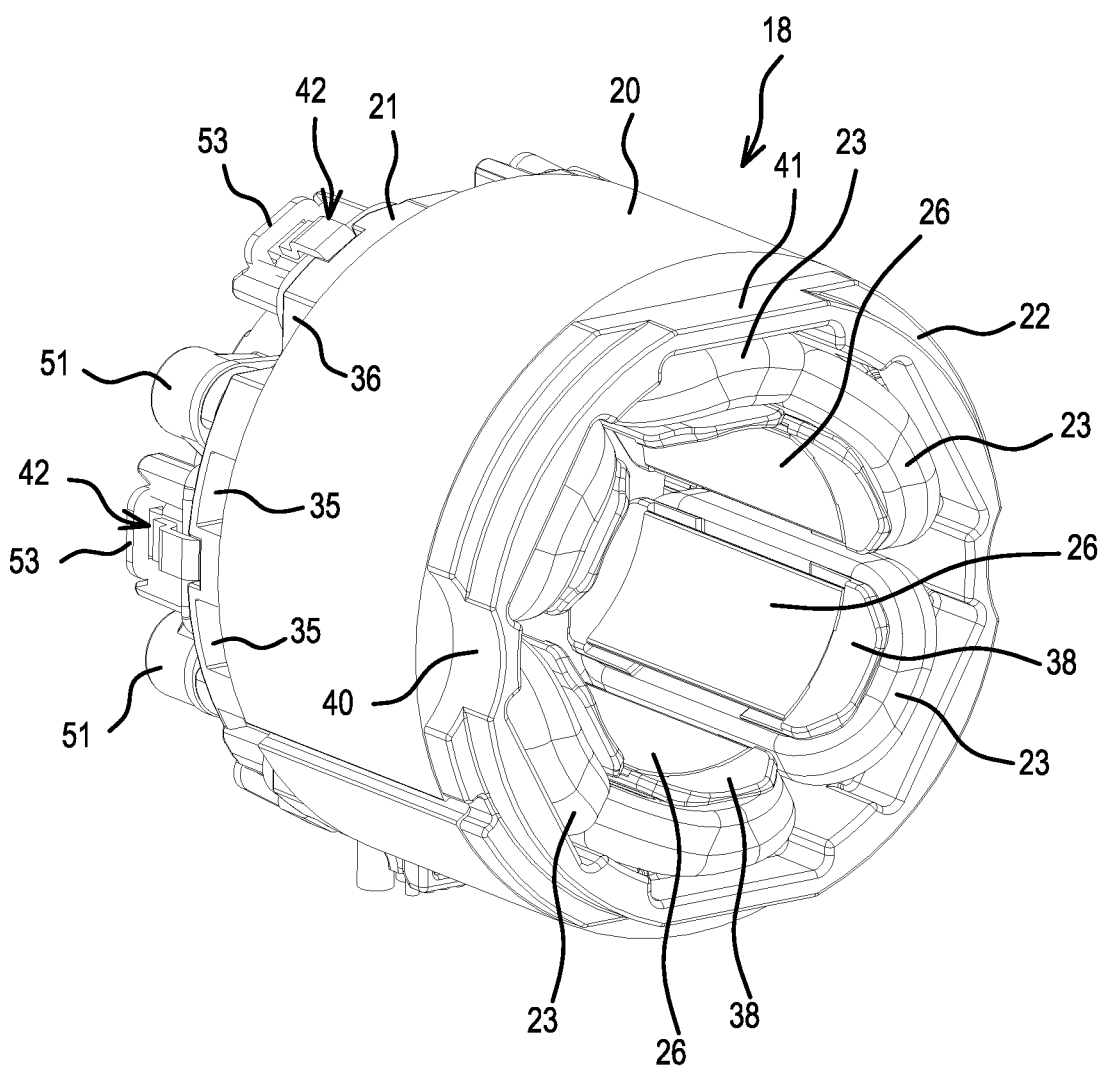
Figure 5:
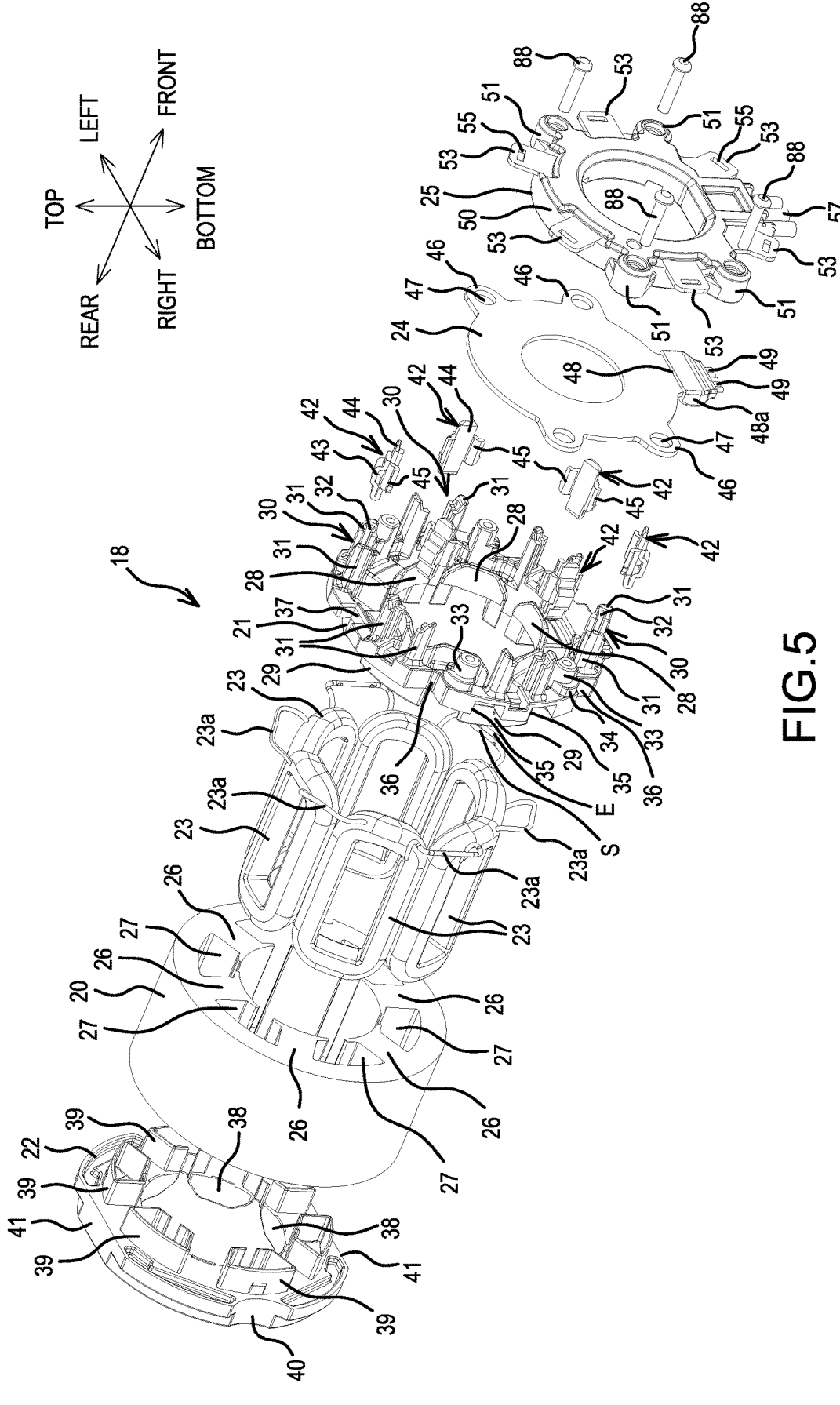
FIG. 5 is an exploded perspective view of the brushless motor.

The brushless motor 17 is housed in a rear part of the main body housing 6 and is an inner rotor type motor that comprises a stator 18 and a rotor 19 rotatably disposed within the stator 18. As shown in FIGS. 3-5, the stator 18 comprises a tubular stator core 20, which is formed from a plurality of laminated steel sheets, a front insulator 21 and a rear insulator 22, which are respectively provided on the front and rear end surfaces of the stator core 20 in the axial direction, and six coils 23, which are wound on the stator core 20 and through (around) the front and rear insulators 21, 22. Furthermore, a sensor circuit board 24 and a short circuiting element 25 are attached to the front insulator 21.

The stator core 20 comprises six teeth 26 that protrude toward the axial center side (radially inward). Six slots 27 are respectively defined between adjacent pairs of the teeth 26 in the circumferential direction of the stator core 20.

The front insulator 21 is an annular, integrally-molded article (structure) and has an outer diameter that is the same (or substantially the same) as the outer diameter of the stator core 20. Six protruding parts (e.g. hooks) 28 protrude in series toward the axial center side (radially inward) and are located forward of the teeth 26 of the stator core 20. The six protruding parts 28 are formed on an inner circumferential side of the front insulator 21. In addition, six mating parts 29 respectively mate with the slots 27 of the stator core 20 and project from a rear surface side of the front insulator 21. Six sets of retaining parts 30 for fusing terminals (connecting terminals) 42, which are discussed below, project from the front surface side of the front insulator 21 at positions that respectively correspond with the mating parts 29. In each of the retaining parts 30, a pair of projections 31, each projection 31 having a groove 32, is disposed at prescribed spacings such that the grooves 32 oppose one another. Screw bosses 33, each of which has a screw hole at its center and extends from a flange part 34 at its base, respectively project between adjacent pairs of the retaining parts 30.

Furthermore, as is shown in FIGS. 3-5 and 7, a pair of recessed parts 35 is formed on both the left and right side parts of the front insulator 21 and serve as positioning parts (discussed further below). A pair of triangular first notched parts 36, 36 is formed on the front insulator 21 and also serve as positioning parts (discussed further below). One first notched part 36 is defined on the upper side and one first notched part 36 is defined on the lower side of the corresponding recessed parts 35, such that the pair of first notched parts 36 sandwich (surround or are formed in the circumferential direction outwardly of) the corresponding recessed parts 35. Furthermore, a quadrangular second notched part 37 is formed at the center of an upper part of the front insulator 21 and also serves as a positioning part (discussed further below). The recessed parts 35, the first notched parts 36, and the second notched part 37 are configured or shaped such that their rear surfaces are closed off by the stator core 20 (see e.g., FIG. 7B).

The rear insulator 22 is also annular and has the same (or substantially the same) outer diameter as that of the stator core 20. Six protruding parts (e.g. hooks) 38 protrude in series toward the axial center side (radially inward) and are located rearward of the teeth 26 of the stator core 20. The six protruding parts 38 are formed on an inner circumferential side of the rear insulator 22. In addition, six mating parts 39 mate with the slots 27 of the stator core 20 and project from a front surface side of the rear insulator 22. Furthermore, curved transverse notched parts 40, 40 are formed on the left and right side parts of the rear insulator 22, and chamfer parts 41, 41, which are notched in a straight line, are formed at the centers of the upper and lower parts of the rear insulator 22.

Furthermore, the fusing terminals (connecting terminals) 42 are respectively retained by the retaining parts 30 of the front insulator 21. Each of the fusing terminals 42 is configured (formed) by folding over a strip-shaped metal fitting approximately in half. Each of the fusing terminals 42 comprises a first edge part 43, an intermediate region having a portion that is bent into the shape of a protrusion, and a second edge part 44. Both side edges of the second edge part 44 are bent to form wing pieces 45, 45 that are L-shaped in a cross section. Thus, when the folded side of each of the fusing terminals 42 is inserted into its corresponding retaining part 30, and the wing pieces 45 are mated with the groove parts 32 of the corresponding projections 31, the fusing terminals 42 are concentric (i.e. are disposed along a virtual circle and thus are all equally spaced from a common center point). Furthermore, the fusing terminals 42 are retained such that the respective first edge parts 43 face toward the outer side (radially outward) with an attitude (a longitudinal orientation) that is parallel to the axial direction of the front insulator 21.

The fusing terminal 42 of the present disclosure may also be called a "thermal crimping terminal" or a "thermal caulking terminal" and generally enables the formation of a secure, robust connection to a lead wire (e.g., winding wire 23a) by applying heat and pressure thereto. For example, a method of forming the electrical connection may involve, e.g., applying a sufficiently-large current to the lead wire to heat and thereby delaminate/melt the insulating coating surrounding the metal wire while the lead wire is sandwiched or interposed within the fusing terminal, and applying a crimping pressure to the fusing terminal 42 to thereby thermally crimp or clamp the lead wire to the fusing terminal 42. The metal of the lead wire may thereby become fused and/or welded to the fusing terminal 42.

In the present embodiment, the coils 23 are respectively wound around the teeth 26 of the stator core 20 and through (around) the respective protruding parts 28, 38 of the front and rear insulators 21, 22. In this respect, it is noted that just one winding wire (i.e. a single continuous wire) is wound sequentially onto the respective teeth 26 that are adjacent in the circumferential direction. All the fusing terminals 42 are electrically connected to the respective winding wires 23a by being fused (crimped or deformed radially inwardly) such that the winding wires 23a (i.e. portions of the single continuous winding wire that respectively provide electrical connections between circumferentially-adjacent pairs of the coils 23) loop around the outer sides of the retaining parts 30 and are respectively sandwiched (crimped or clamped) in the fusing terminals 42, as can be best seen in FIG. 3.

Figure 6A:
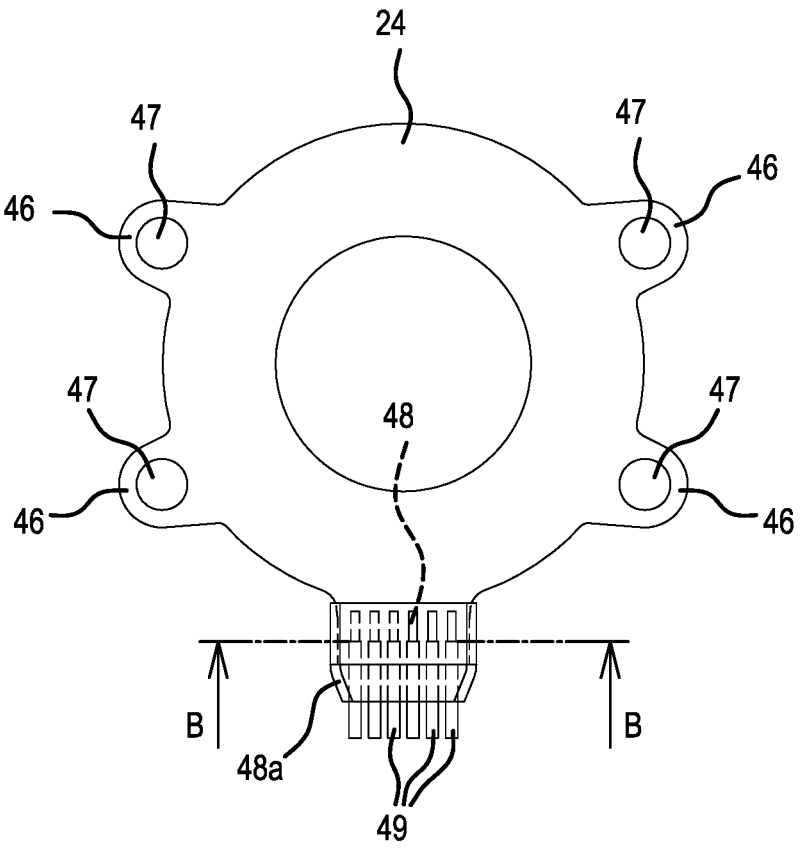
FIG. 6A is a front view thereof.
Figure 6B:
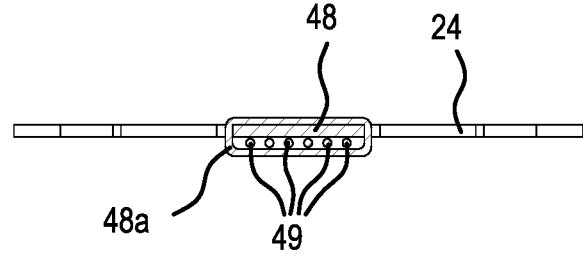
FIG. 6B is a cross sectional view taken along the B-B line in FIG. 6A.
Figures 7A, 7B, 7C:
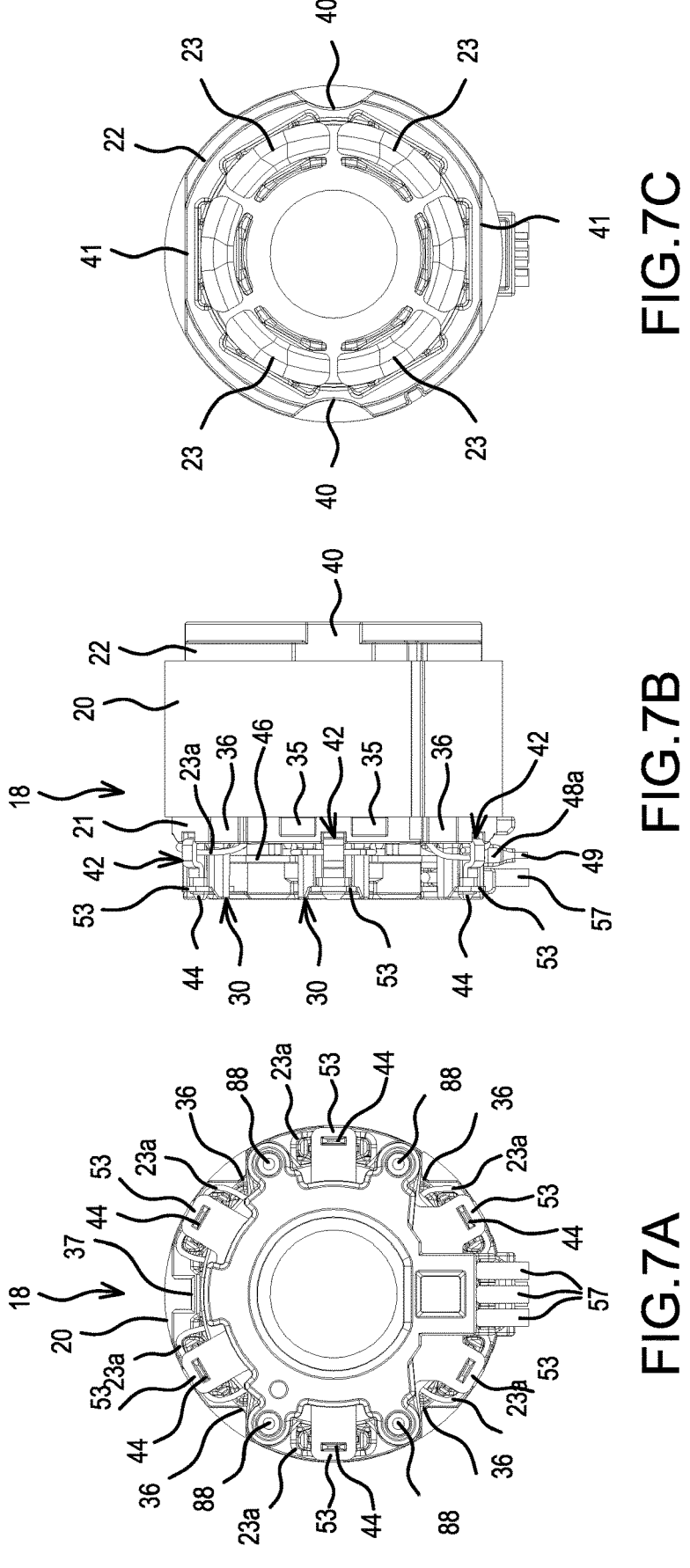
FIG. 7A is a front view thereof.
FIG. 7B is a side view thereof.
FIG. 7C is a rear view thereof.

Referring now to FIG. 2, the sensor circuit board 24 is equipped with three rotation detection devices (not shown), which detect the positions of permanent magnets 63 provided on the rotor 19 and output rotation detection signals. As can be seen in FIG. 5, the sensor circuit board 24 has an overall doughnut shape and its outer diameter fits within the radially inner sides of the retaining parts 30. Furthermore, as is also shown in FIG. 6, four projections 46 have through holes 47 that correspond to the screw bosses 33 of the front insulator 21 and extend at the outer circumference of the sensor circuit board 24. Due to the fact that the screw bosses 33 respectively pass through the through holes 47, the projections 46 respectively make contact with the flange parts 34 and are positioned at the front surface of the front insulator 21. A leader part 48 for signal lines 49 of the rotation detection devices is provided at the center of a lower part of the sensor circuit board 24, and a heat shrink tube 48a, which includes an adhesive, covers and extends across the leader part 48 and the signal lines 49. Using the heat shrink tube 48a makes it possible to simultaneously waterproof and prevent a break in the signal lines 49.

Figure 8B:
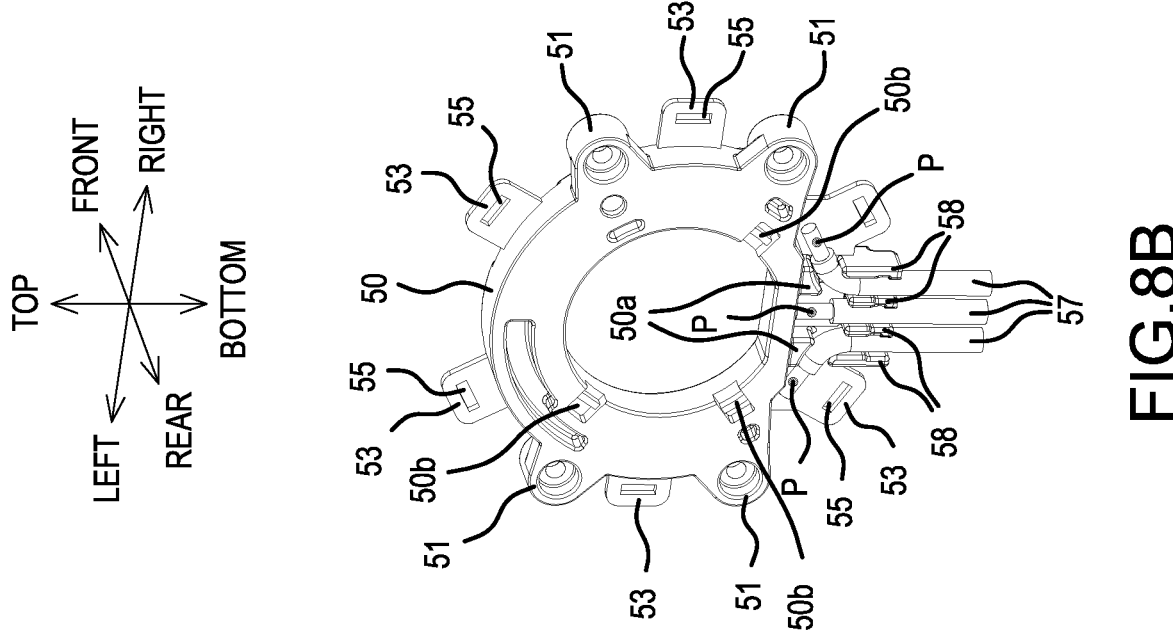
FIG. 8B is a perspective, rear view of the short circuiting element.
Figure 8A:
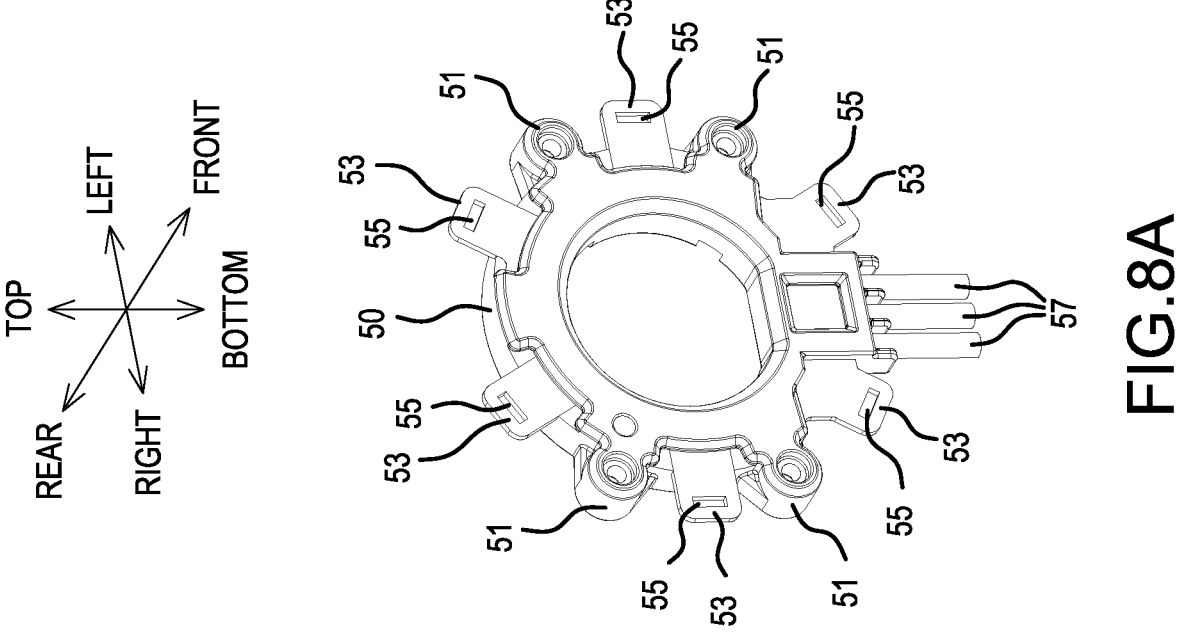
FIG. 8A is a perspective, front view of a representative short circuiting element.
Figure 9C:
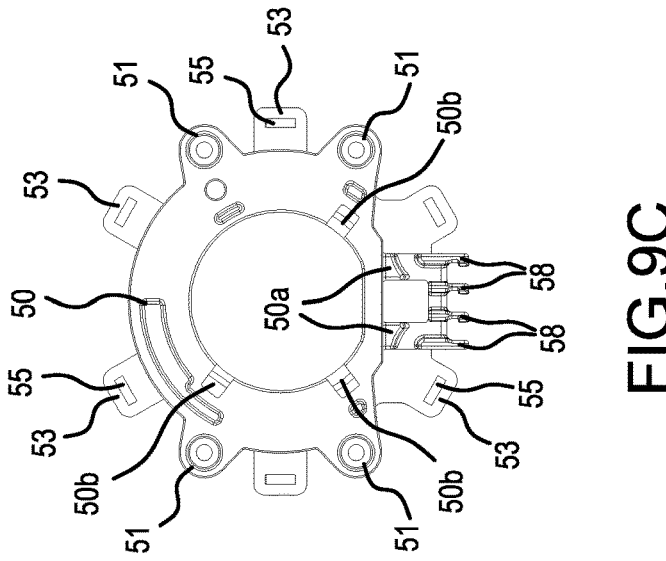
FIG. 9C is a rear view thereof.
Figure 9B:
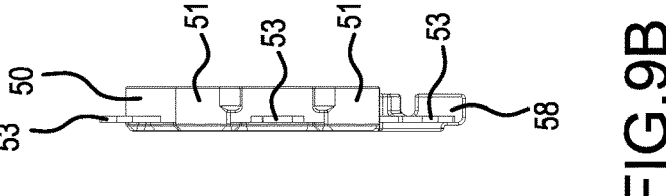
FIG. 9B is a side view thereof.
Figure 9A:
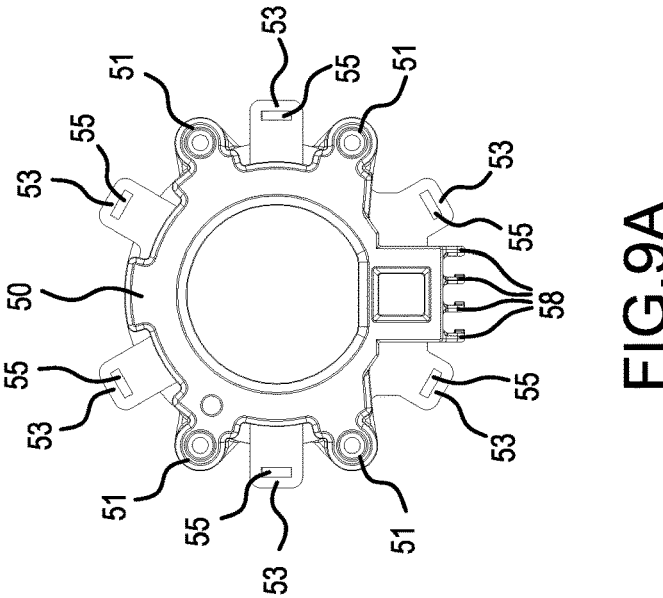
FIG. 9A is a front view thereof.
Figure 10:
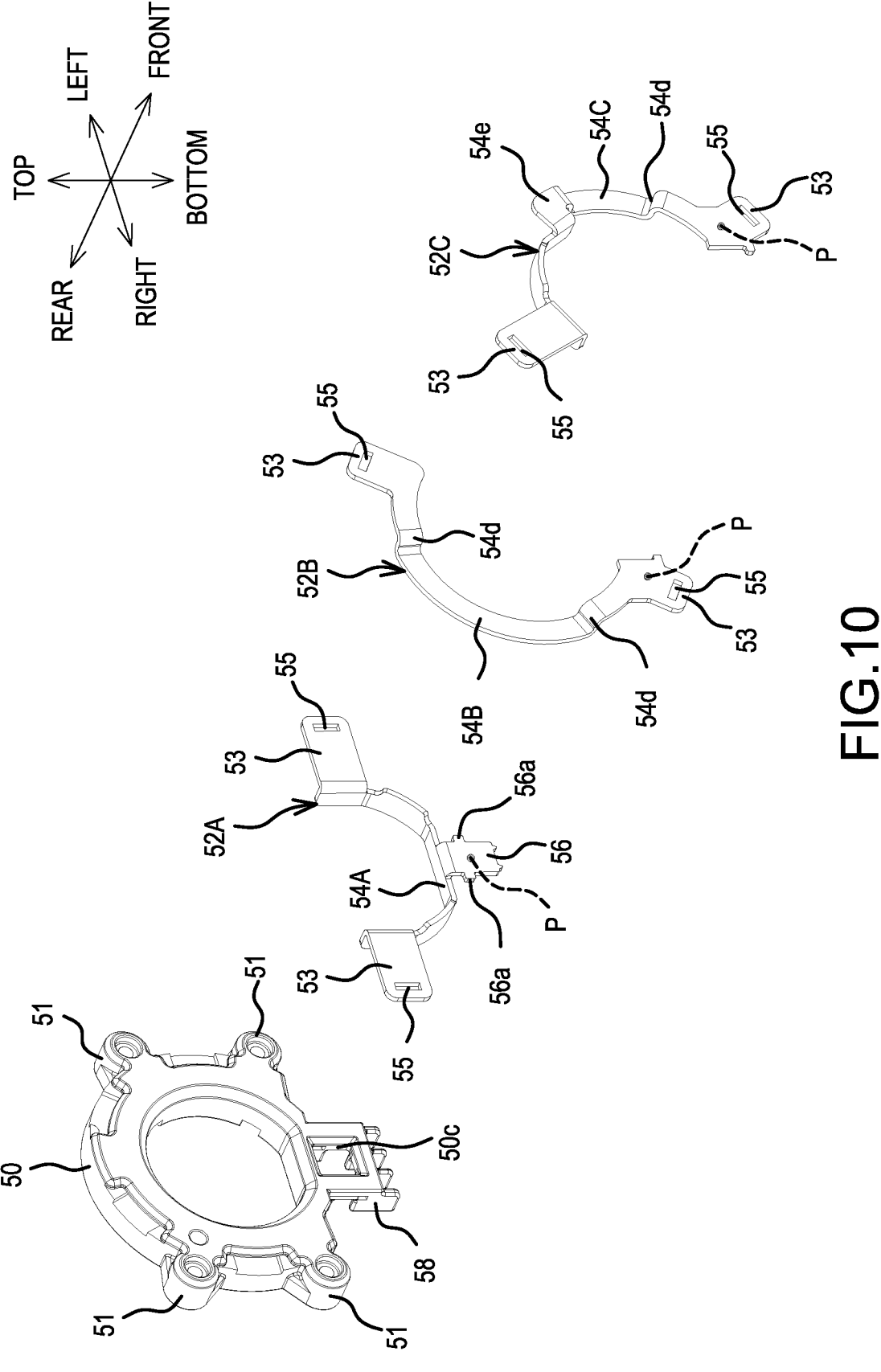
FIG. 10 is an exploded perspective view of the short circuiting element.
Figure 11:
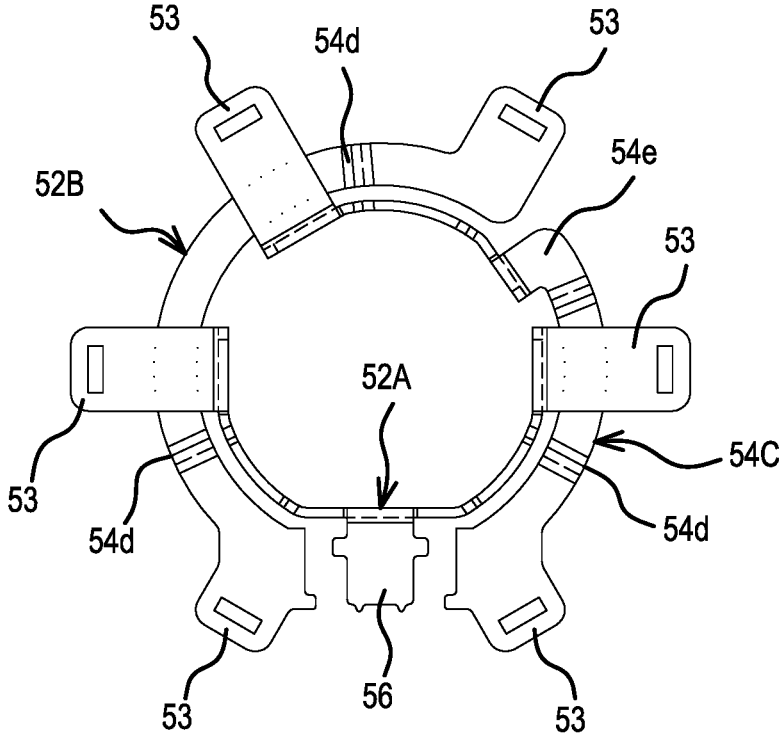
FIG. 11 is an explanatory diagram that shows the arrangement of sheet metal elements of the short circuiting element.

Further explanation of the representative short circuiting element 25 will now be provided with reference to FIGS. 8 and 9. As shown therein, four tubular bosses 51 are configured to respectively mate with the screw bosses 33 of the front insulator 21 from the rear. The four tubular bosses 51 integrally project at the outer circumference of an annular, resin insulation part 50, whose outer diameter is substantially the same as the outer diameter of the sensor circuit board 24. In addition, as can also be seen in FIG. 10, three sheet metal elements, namely, a first sheet metal element 52A, a second sheet metal element 52B, and a third sheet metal element 52C, are insert molded in the insulation part 50. The first sheet metal element 52A is formed by radially outwardly bending a pair of short circuiting pieces (tabs or terminals) 53, 53, which are respectively extend from the left and right ends of a (lower) coupling part 54A. The coupling part 54A is curved in a U shape and is longitudinally oriented such that its thickness direction is in the radial direction of the stator 18. The second sheet metal element 52B comprises a pair of short circuiting pieces (tabs or terminals) 53, 53 on the lower right and the upper left of a coupling part 54B, which is on the left side, is arcuately curved, and is longitudinally oriented such that its thickness direction is the rear-front direction of the stator 18. A center portion of the coupling part 54B is offset rearward by bent parts 54d, 54d. The third sheet metal element 52C comprises a pair of short circuiting pieces (tabs or terminals) 53, 53 respectively extending from the lower left and the upper right of a coupling part 54C, which is on the right side and is arcuately curved. A transversely-oriented semicircular portion of the coupling part 54C is offset rearward from the short circuiting piece 53 on the lower left of the coupling part 54C by a bent part 54d. The remaining semicircular portion is curved on the inner side in a longitudinal orientation via a folded part 54e. The short circuiting piece 53 on the upper right is bent outward. The sheet metal elements 52A-52C each have a semi-circular shape in radial cross-section. As shown in FIG. 11, these three sheet metal elements 52A-52C are insert molded (embedded) in the insulation part 50 in a state wherein the second sheet metal element 52B is disposed rearward of and on the left side of the first sheet metal element 52A, the third sheet metal element 52C is disposed rearward of and on the right side of the first sheet metal element 52A, and such that the sheet metal elements 52A-52C concentrically overlap without contacting each other. Therefore, the insulation part 50 retains or holds the sheet metal elements 52A-52C in a physically and electrically separated state, i.e. they are electronically isolated from each other.

Therefore, at the outer circumference of the insulation part 50, the respective pairs of short circuiting pieces 53 (six in total), which are disposed diagonally (diametrically) opposite one another and are electrically interconnected, radially project in correspondence with the fusing terminals 42 retained by the front insulator 21. Slits (slots) 55, into which the second edge parts 44 of the fusing terminals 42 can be respectively inserted, are formed at or in the tips (radially outer portions) of the short circuiting pieces 53.

Furthermore, referring to FIG. 11, a connecting piece 56 is located between the short circuiting piece 53 on the lower side of the second sheet metal element 52B and the short circuiting piece 53 on the lower side of the third sheet metal element 52C. The connecting piece 56 is formed downward facing at the center of a lower end of the coupling part 54A of the first sheet metal element 52A. The U-phase, V-phase, and W-phase power supply lines 57 are respectively spot welded to the rear surface of the short circuiting piece 53 on the lower side of the second sheet metal element 52B, the short circuiting piece 53 on the lower side of the third sheet metal element 52C, and the connecting piece 56. As shown in FIGS. 10 and 11, two projections 56a, 56a increase the coupling strength to the insulation part 50 and are formed on the left and right of the connecting piece 56. Guide ribs 58 partition the respective power supply lines 57, guide the power supply lines 57 downward from the sheet metal elements 52A-52C, retain the power supply lines 57, and are disposed in the up-down direction. The guide ribs 58 are provided in parallel, integrally, and erectly to a lower end back surface of the insulation part 50. In addition, as shown in the rear surface view of the insulation part 50 in FIG. 9C, guide projections 50a respectively guide the left and right power supply lines 57 to the short circuiting pieces 53 side, and are formed on an upper side of the guide ribs 58. Recessed parts 50b, 50b for positioning are formed on an inner circumferential side of the insulation part 50. As shown in FIG. 10, a through hole 50c for exposing the connecting piece 56 and thereby increasing its heat dissipating capacity is formed in a lower part of the insulation part 50. Positions P shown in FIGS. 8, 10 are the locations at which the respective power supply lines 57 are welded.

In the assembled state, the short circuiting element 25 overlaps the sensor circuit board 24 from the front such that the screw bosses 33 of the front insulator 21 are inserted into the bosses 51 and the short circuiting element 25 is affixed thereto by screws 88. Furthermore, the second edge parts 44 of the fusing terminals 42 are respectively inserted into the slits 55 of the corresponding short circuiting pieces 53. In the present embodiment, the sheet metal elements 52A-52C are not exposed at the rear surface of the insulation part 50 and therefore do not contact the sensor circuit board 24 due to the intervening resin of the insulating part 50. Furthermore, the center hole of the sensor circuit board 24 is preferably smaller than the center hole of the short circuiting element 25 in the present embodiment.

Figure 12:
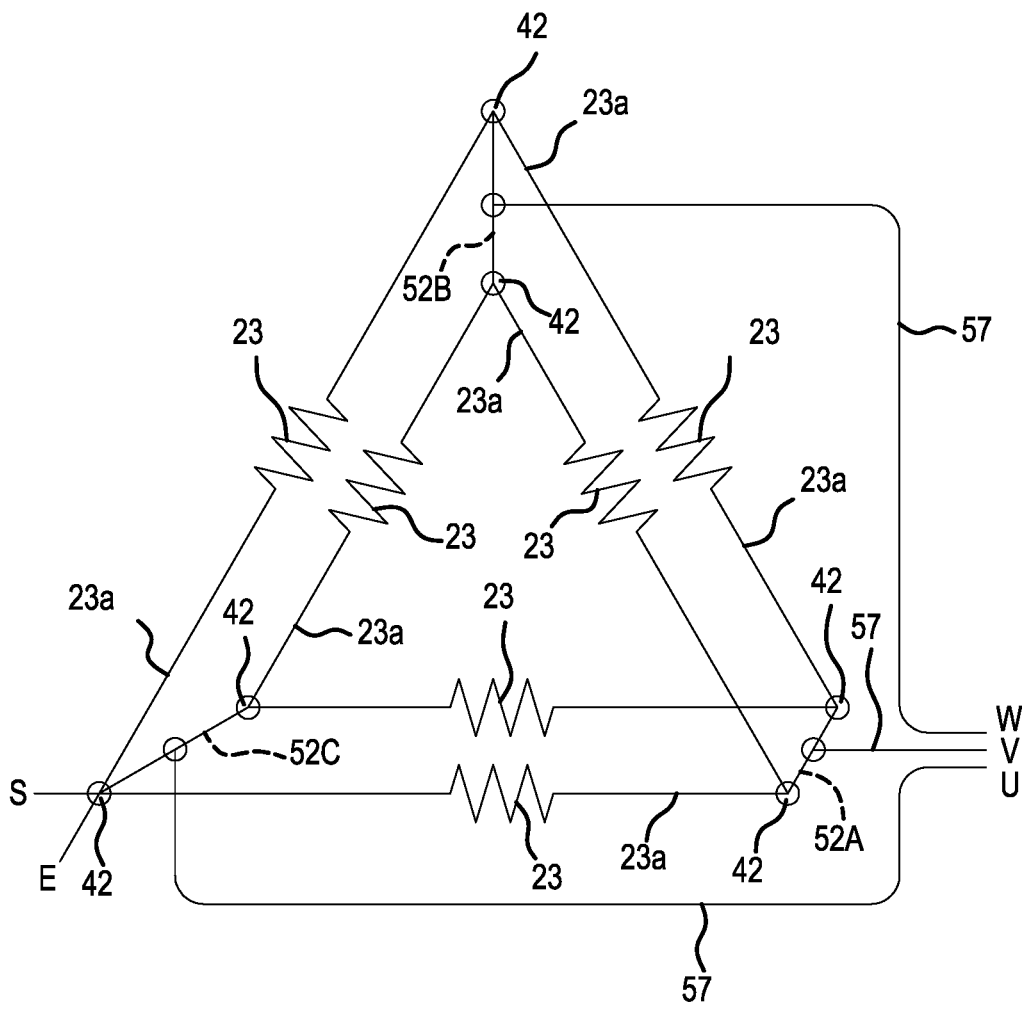
FIG. 12 shows a representative wiring diagram for the coils.

If the fusing terminals 42 and the short circuiting pieces 53 are soldered in this state, then the respective pairs of fusing terminals 42, 42, which are located with point symmetry (i.e. diametrically opposite of each other), are short circuited (shunted or electrically connected) by the first through third sheet metal elements 52A-52C. Thus, as shown in the wiring diagram of FIG. 12, each of the fusing terminals 42 is electrically connected to one of the winding wires 23a between circumferentially-adjacent coils sequentially wound around the stator core 20. Further, respective pairs of fusing terminals 42 that are diagonally (diametrically) opposite one another are electrically interconnected by the first through third sheet metal elements 52A-52C, thereby forming a parallel-winding delta connection. Reference symbol S is the start of the winding (i.e. the single continuous winding wire), and reference symbol E is the end of the same winding.

In the present embodiment, because the fusing terminals 42 and the short circuiting element 25 are separate bodies, and the short circuiting pieces 53 of the short circuiting element 25 are soldered onto the fusing terminals 42 after the coils 23 have been wound, the short circuiting element 25 is not a hindrance during the manufacturing step of winding the respective coils 23 on the teeth 26 of the stator core 20 and on the front and rear insulators 21, 22.

In addition, the fusing terminals 42 are formed with a sufficient height (axial length) to provide a stable and durable connection (joining). However, as shown in e.g., FIG. 2, FIG. 7(B), the sensor circuit board 24 and the short circuiting element 25 fit within the height (axial length) dimension of the fusing terminals 42, and consequently the entire (axial) length of the brushless motor 17 is kept to a minimum even though the short circuiting element 25, etc. are used (installed). Furthermore, except for the signal lines, the power supply lines, and the like, all the elements fit within the outer diameter of the stator core 20. Consequently, the outer diameter of the product also does not increase, and the product is therefore compact.

Figure 13:
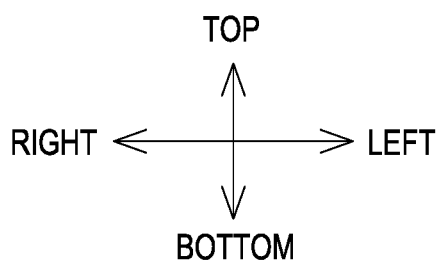
FIG. 13 is a cross sectional view taken along the A-A line in FIG. 2.

As shown in FIG. 13, the thus-assembled stator 18 is housed (supported) while being positioned in the axial direction and in the circumferential direction in the following manner. The outer circumference of the stator core 20 is held by support ribs 59, which project in the circumferential directions from the inner surfaces of the half housings 6a, 6b of the main body housing 6. In addition, the outer circumference of the stator core 20 is also held by projections 60, which project from the inner surface of the half housing 6a and respectively mate with the recessed parts 35, which are formed (defined) in the side surface of the front insulator 21. Furthermore, when the stator 18 is to be housed in the half housings 6a, 6b, the assembly is done while ensuring that the planar surfaces of the chamfer parts 41 do not contact the support ribs 59, which makes it easy to perform the assembly in the desired orientation. The recessed part at the center of each of the projections 60 has a reduced thickness; therefore, if the projections 60 are formed also in the half housing 6b, the stator 18 can be more suitably held.

Moreover, as shown in FIG. 2, the rotor 19 comprises: a rotary shaft 61, which is located at the axial center; a tubular rotor core 62, which is disposed around the rotary shaft 61; and the permanent magnets 63, which are disposed on the outer side of the rotor core 62 and have polarities that alternate in the circumferential direction of the cylindrical shape.

The rear end of the rotary shaft 61 is pivotally supported by a bearing 64, which is held by the cap housing 9, and a centrifugal fan 65 is attached at a forward position thereof. In the present embodiment, a center part of the centrifugal fan 65 bulges forward so as to form a cone shape, and the bearing 64 has a shape that projects rearward therefrom. Due to this design, the distance between the cap housing 9 and the centrifugal fan 65 becomes shorter (can be decreased), resulting in a shortening of the overall length of the driver-drill 1. Reference numbers 66 are air suction ports (FIG. 1) that are respectively formed on the left and right side surfaces of the main body housing 6, and reference numbers 67 are exhaust ports (FIGS. 1, 2) that are respectively formed on the left and right side surfaces of the cap housing 9.

In addition, as shown in FIG. 2, a gear case 68 houses (surrounds) the planetary gear speed reducing mechanism 72 and is provided forward of the brushless motor 17. The front end of the rotary shaft 61 is inserted through a cap 69, which closes up a rear end of the gear case 68, and is pivotally supported by a bearing 70, which is held by the cap 69. A pinion 71 is fastened to the front end of the rotary shaft 61.

The planetary gear speed reducing mechanism 72 has a well-known structure. A plurality of carriers 75 respectively support a plurality of planetary gears 74, 74 that revolve inside an internal gear 73, and are provided in parallel in the axial direction. Furthermore, a second stage internal gear (denoted as reference number 73A in order to distinguish such) is provided such that it can move frontward and rearward in the axial directions between an advanced position and a retracted position. In the advanced position, the second stage internal gear is fixed inside the gear case 68 and the second stage planetary gears 74 are caused to revolve. In the retracted position, the second stage planetary gears 74 and the first stage carriers 75 are simultaneously engaged, the carriers 75 and the planetary gears 74 are caused to rotate integrally, and the second stage speed reduction is canceled. A speed changing ring 77 is coupled to the internal gear 73A via pins 76. A projection 78 at an upper end of the speed changing ring 77 is coupled to a speed changing button (speed changing lever) 80 via front and rear coil springs 79, 79. By sliding the speed changing button 80 to the front or to the rear, the internal gear 73A is caused to respectively move frontward and rearward via the speed changing ring 77, making it possible to select a low speed mode at the advanced position and a high speed mode at the retracted position.

In the driver-drill 1 configured as described above, when the trigger 15 is squeezed, the switch turns ON and the brushless motor 17 is driven by the power supply of the battery pack 5. That is, a not-shown microcontroller of a controller, which is housed in the lower part of the handle 3, determines the rotational state of the rotor 19 by obtaining the rotation detection signals, which indicate the positions of the permanent magnets 63 of the rotor 19, output from the rotation detection devices of the sensor circuit board 24, and controls the ON/OFF state of each of the switching devices in accordance with the determined rotational state. Then, the rotor 19 is rotated by sequentially supplying electric current to each of the (diametrically-opposite pairs of) coils 23 of the stator 18. This causes the rotary shaft 61 to rotate, and the rotation, the speed of which is reduced by the planetary gear speed reducing mechanism 72, is transmitted to the spindle and rotates the chuck 13. By rotating the mode changing ring 11, it is possible to select either the driving mode, wherein the transmission of rotation at the prescribed torque is blocked and the clutch mechanism functions, or a drilling mode, wherein the clutch mechanism does not function. Furthermore, by operating the clutch adjusting ring 12, the torque, at which the clutch mechanism operates in the driving mode, can be adjusted.

Furthermore, because the coils 23 of the present brushless motor 17 are in the parallelly wound state, the electrical resistance of the winding is reduced and a large current can be supplied. This parallelly wound state can be achieved by using the short circuiting element 25, which makes it possible to save space. That is, as shown in FIG. 2, because the relatively-thin short circuiting element 25 is disposed within the inner sides of the retaining parts 30 and is assembled such that the short circuiting element 25 does not protrude forward of the tips of the projections 31 of the retaining parts 30, the space forward of the sensor circuit board 24 can be used effectively (efficiently) to install the short circuiting element 25, thereby making the compact size maintainable.

In addition, because the six coils 23 are wound with a single winding wire (i.e. a single wire having no breaks or interruptions in it), all the coils 23 can be completely wound in a single manufacturing step, and crossover wires for connecting coils wound around the teeth that are diametrically positioned (opposed) become unnecessary. The absence of crossover wires also leads to making the product compact.

Furthermore, because the sensor circuit board 24 is provided on one end side of the brushless motor 17 and the power is supplied to the coils 23 from the same side, it becomes possible to supply a large current while maintaining the compact size. In particular, because the sensor circuit board 24 and the short circuiting element 25 are arranged in order (successively) on the one end side of the stator 18, the sensitivity of the sensors is satisfactory.

Figure 14B:
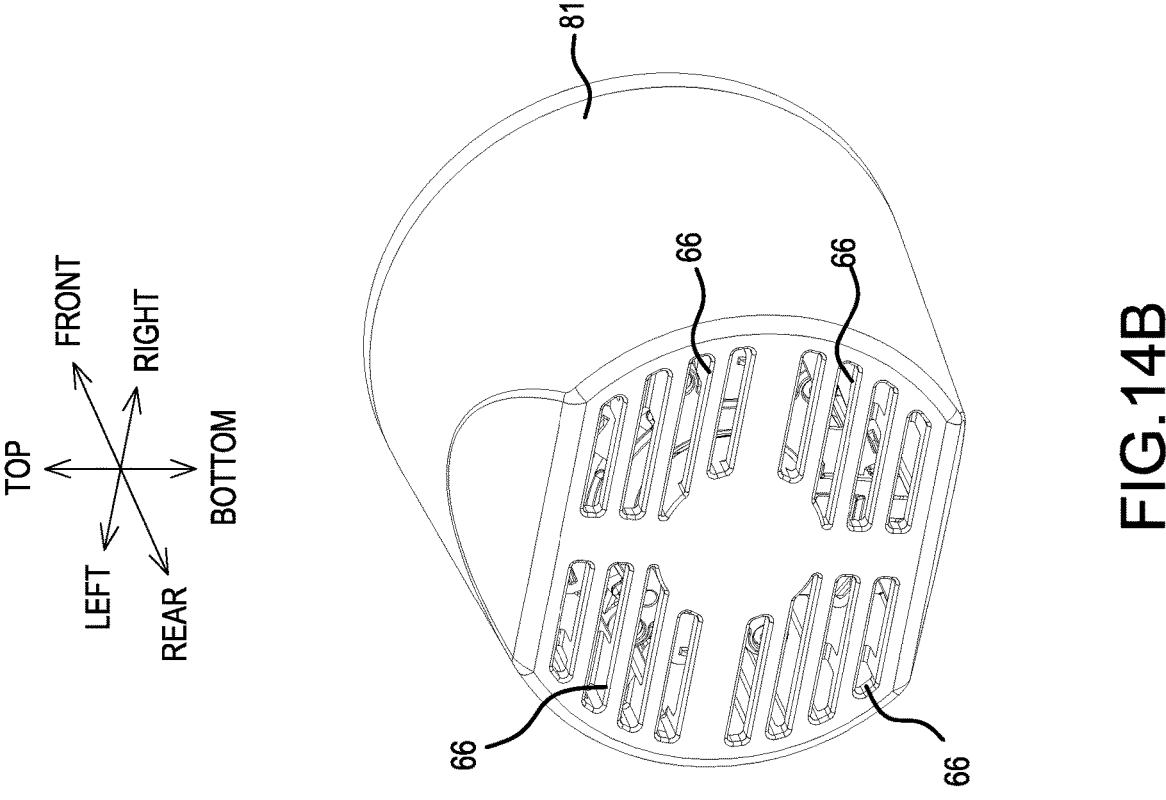
FIG. 14B is a perspective, rear view of the tubular housing.
Figure 14A:
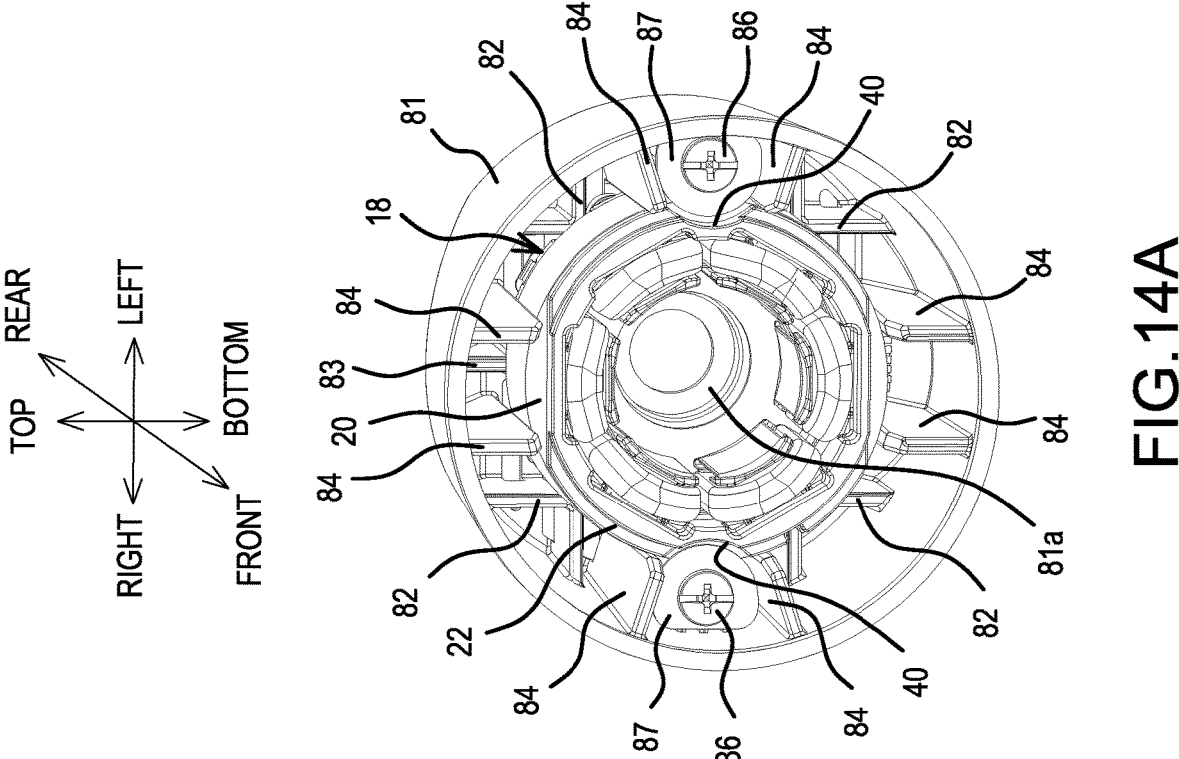
FIG. 14A is a perspective, front view of a representative tubular housing.
Figure 15B:
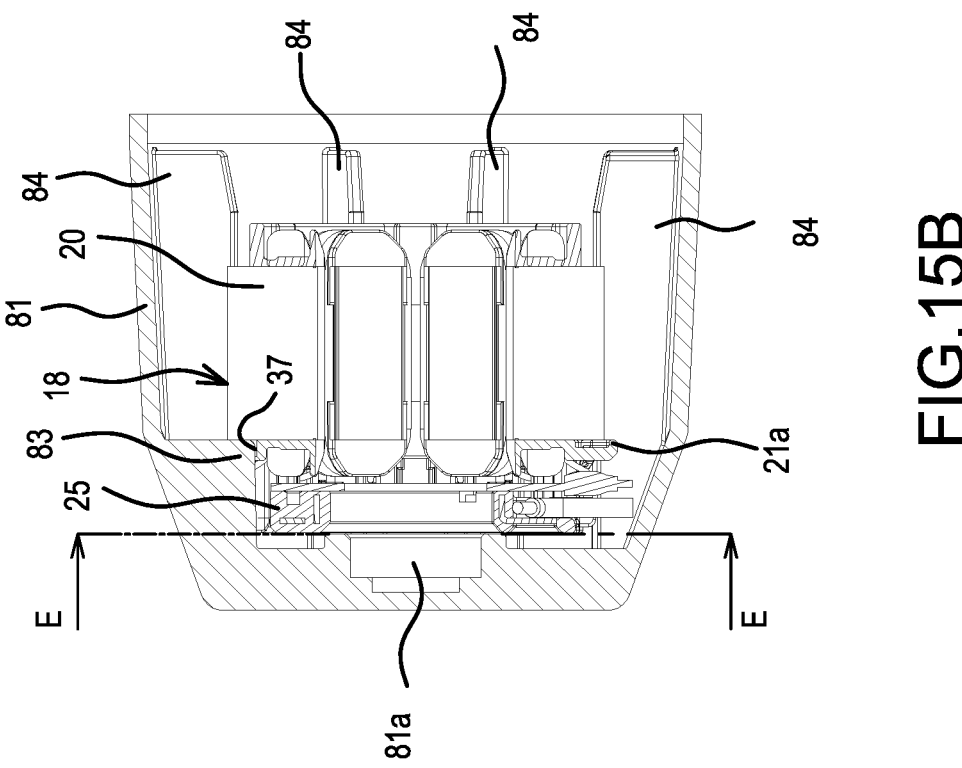
FIG. 15B is a cross sectional view taken along the C-C line in FIG. 15A.

Furthermore, in the above-mentioned embodiment, a structure is utilized in which the brushless motor 17 is housed in the main body housing 6, which is formed of the two half housings 6a, 6b. However, as shown in, for example, FIGS. 14-16, if the brushless motor 17 is housed in a tubular housing that is used in a circular saw or the like, then, in the state wherein the stator 18 of the brushless motor 17 is oriented rearward, the short circuiting element 25 side being rearward, a bottom part of a tubular housing 81 is provided with four L-shaped receiving ribs 82, whose tips mate with the four first notched parts 36 of the front insulator 21 of the stator 18 and which make contact with the end surface of the stator core 20. A plate-shaped rotation stopping rib 83 has a tip that mates with the second notched part 37 of the front insulator 21 and it makes contact with the end surface of the stator core 20. Furthermore, in front of these, pairs of longitudinal ribs 84 make contact with a circumferential surface of the stator 18 and are provided with up-down and left-right symmetry. Reference number 81a is a housing recessed part of a bearing. Thus, providing the tubular housing 81 with engagement portions between the insulator and the stator makes it possible to suitably assemble the stator 18.

In addition, screw bosses 85 are provided with heights are such that the screw bosses 85, 85 are flush with the end surface of the stator core 20 in the housed state. The screw bosses 85 are respectively provided between the left longitudinal ribs 84, 84 and between the right longitudinal ribs 84, 84. Furthermore, by tightening the screws 86 from the front through the washers 87 into the screw bosses 85, it is possible to mate the washers 87 against the transverse notched parts 40 of the rear insulator 22 and thereby to press the end surface of the stator core 20 from the front.

Figure 15A:
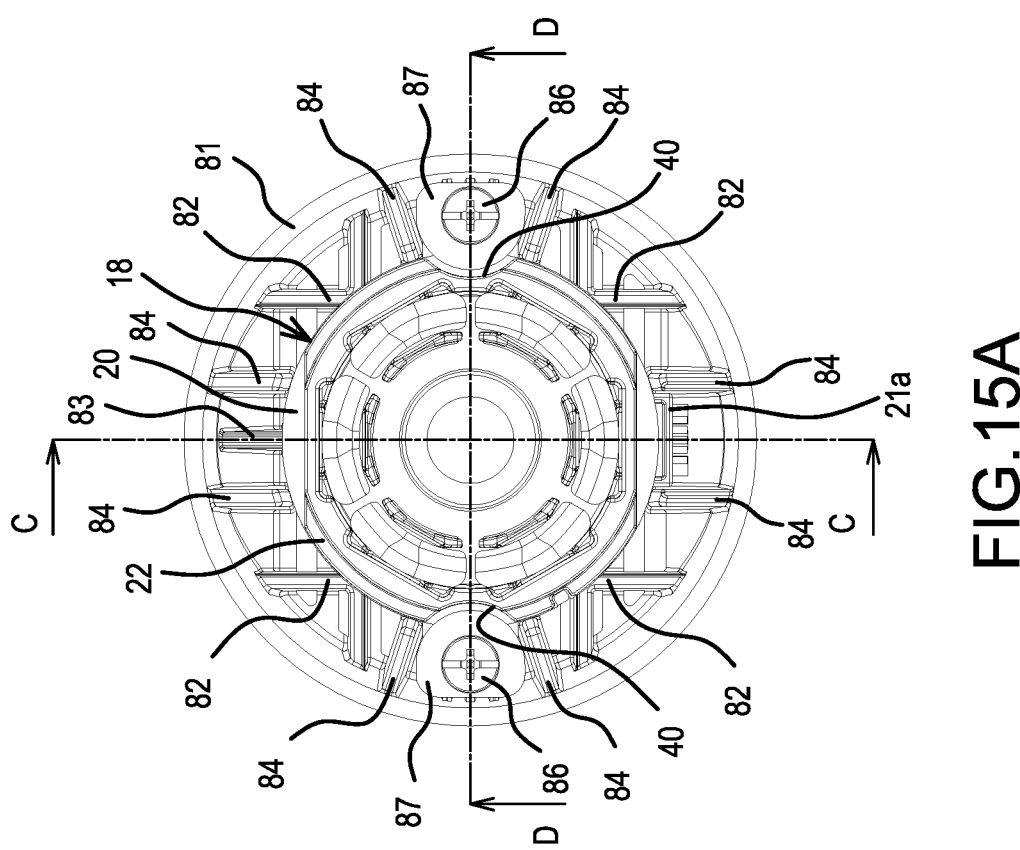
FIG. 15A is a front view of the tubular housing.
Figure 16B:
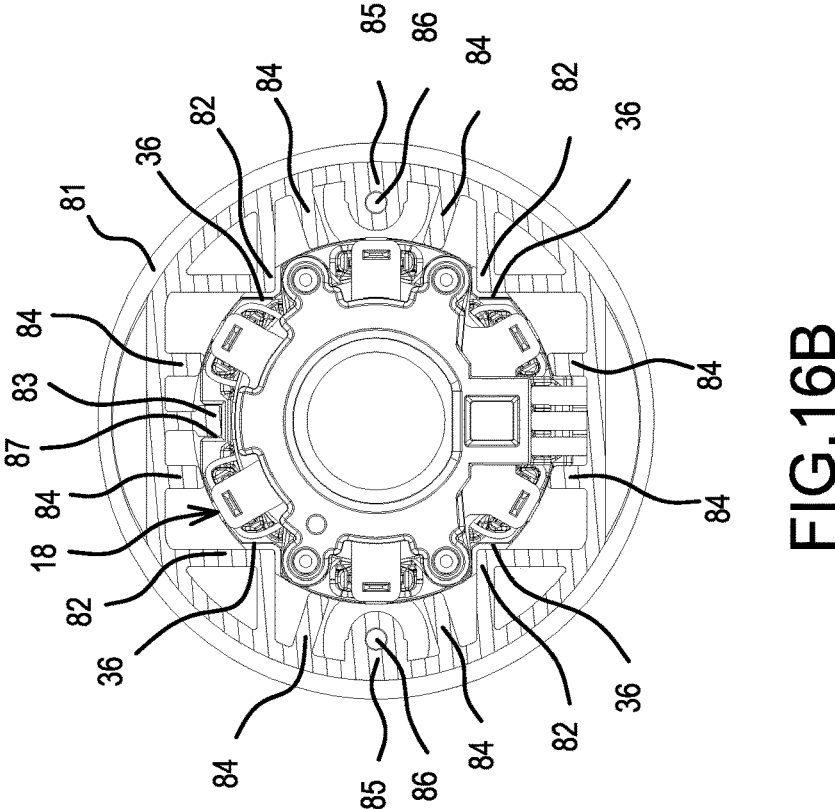
FIG. 16B is a cross sectional view taken along the E-E line in FIG. 15B.
Figure 16A:
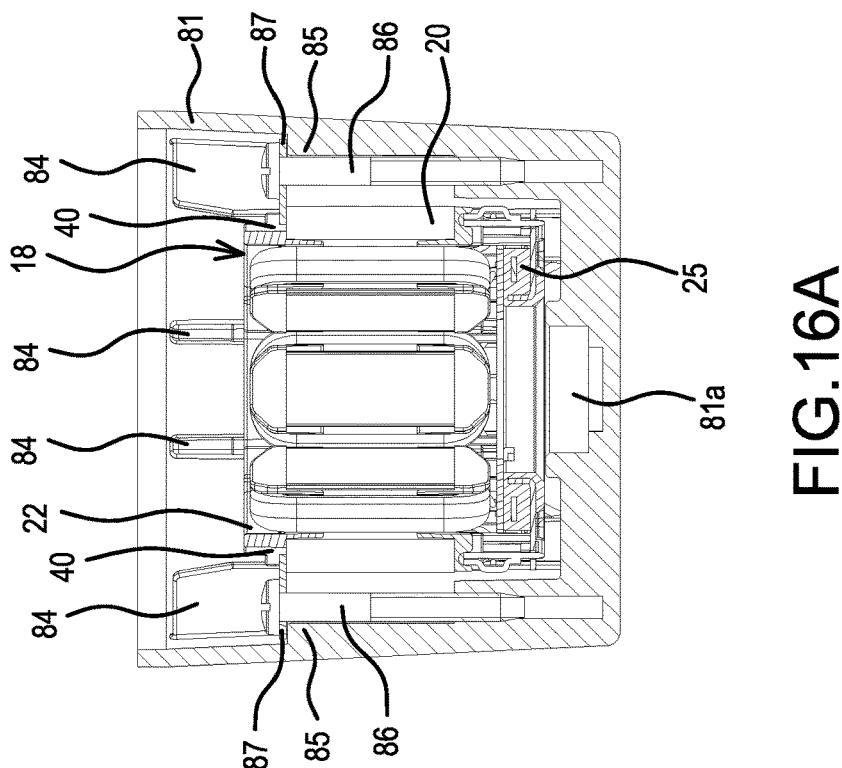
FIG. 16A is a cross sectional view taken along the D-D line in FIG. 15A.

As a result of this design, the stator 18 is prevented from moving rearward by the receiving ribs 82 and is prevented from moving in the circumferential direction by the rotation stopping rib 83. Moreover, the stator 18 is centered inside the tubular housing 81 by the longitudinal ribs 84. Furthermore, forward movement is prevented by the screws 86 and the washers 87. In addition, because a guide part 21a projects from the front insulator 21, when the stator 18 is pressed in, the stator 18 can be smoothly set to the target position if the guide part 21a is pressed in such that it fits between the longitudinal ribs 84, 84, as shown in FIG. 15A. After being pressed in, it is also positioned in the circumferential direction.

Thus, in embodiments having a tubular housing 81 as well, the stator 18 can be positioned simply by using the notched parts 36, 37, 40 provided in the front and rear insulators 21, 22, and it also becomes possible to standardize the front and rear insulators 21, 22.

Figure 17:
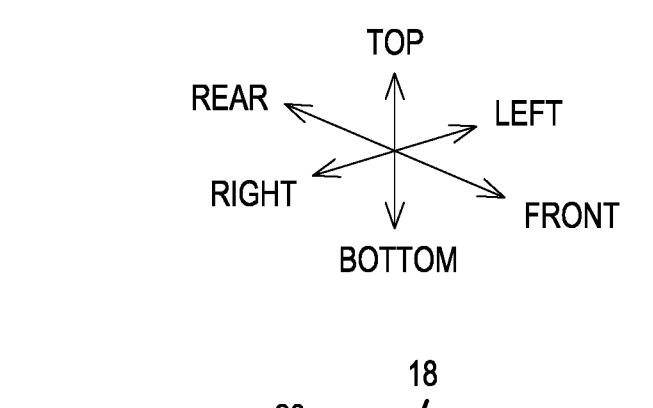
FIG. 17 is a perspective view of another brushless motor, wherein the orientation of the sensor circuit board has been changed (rotated by 180° as compared to the orientation shown in FIG. 3).
Figure 18:
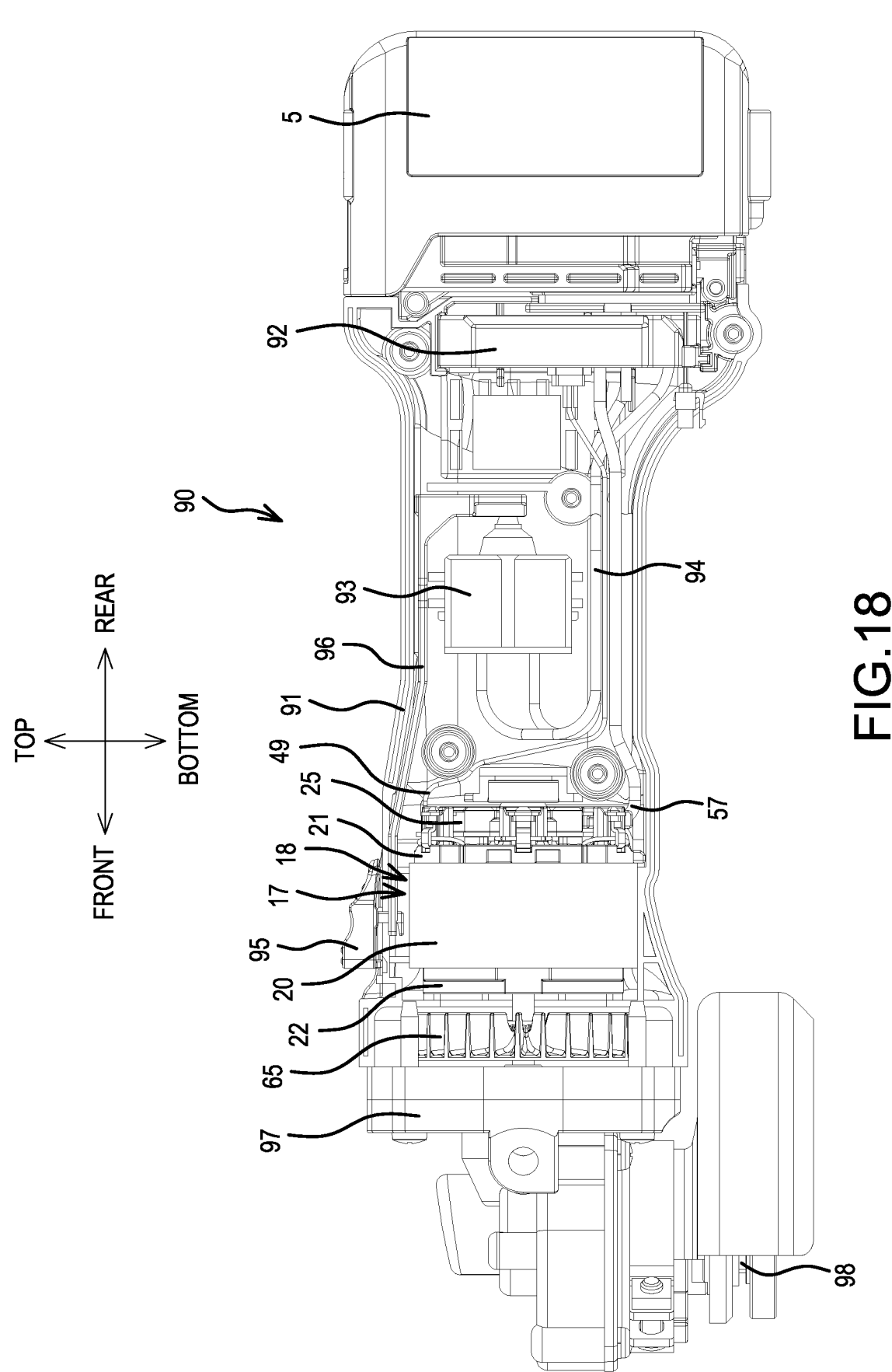
FIG. 18 is a longitudinal cross sectional view of a representative grinder according to the present teachings.

Moreover, although in the above-mentioned embodiment the signal lines 49 of the sensor circuit board 24 extend from the same side (i.e., the lower side) as the power supply lines 57 of the short circuiting element 25 (see FIG. 7B), the signal lines 49 may extend from the upper side by changing (rotating) the phase (orientation) of the sensor circuit board 24 by 180°, which embodiment is exemplified by the stator 18 shown in FIG. 17 (compare the orientation of the sensor circuit boards in FIGS. 3 and 17). Thus, as in, for example, a grinder 90 as shown in FIG. 18, even if a (tubular) motor housing 91 that houses the brushless motor 17 also serves as a grip part, the motor housing 91 is prevented from protruding on the power supply lines 57 side, and thereby the motor housing 91 can be narrowed at that portion. In addition, in terms of other aspects of the structure as well, the wiring is simpler and, moreover, the insulator can also be standardized. Furthermore, in FIG. 18: reference number 92 is a controller; reference number 93 is a switch that is connected to the controller 92 via a lead wire 94; reference number 95 is a slide button that turns the switch 93 ON and OFF via a linking bar 96; and reference number 97 is a front housing having a downwardly-protruding spindle 98.

Figure 19:
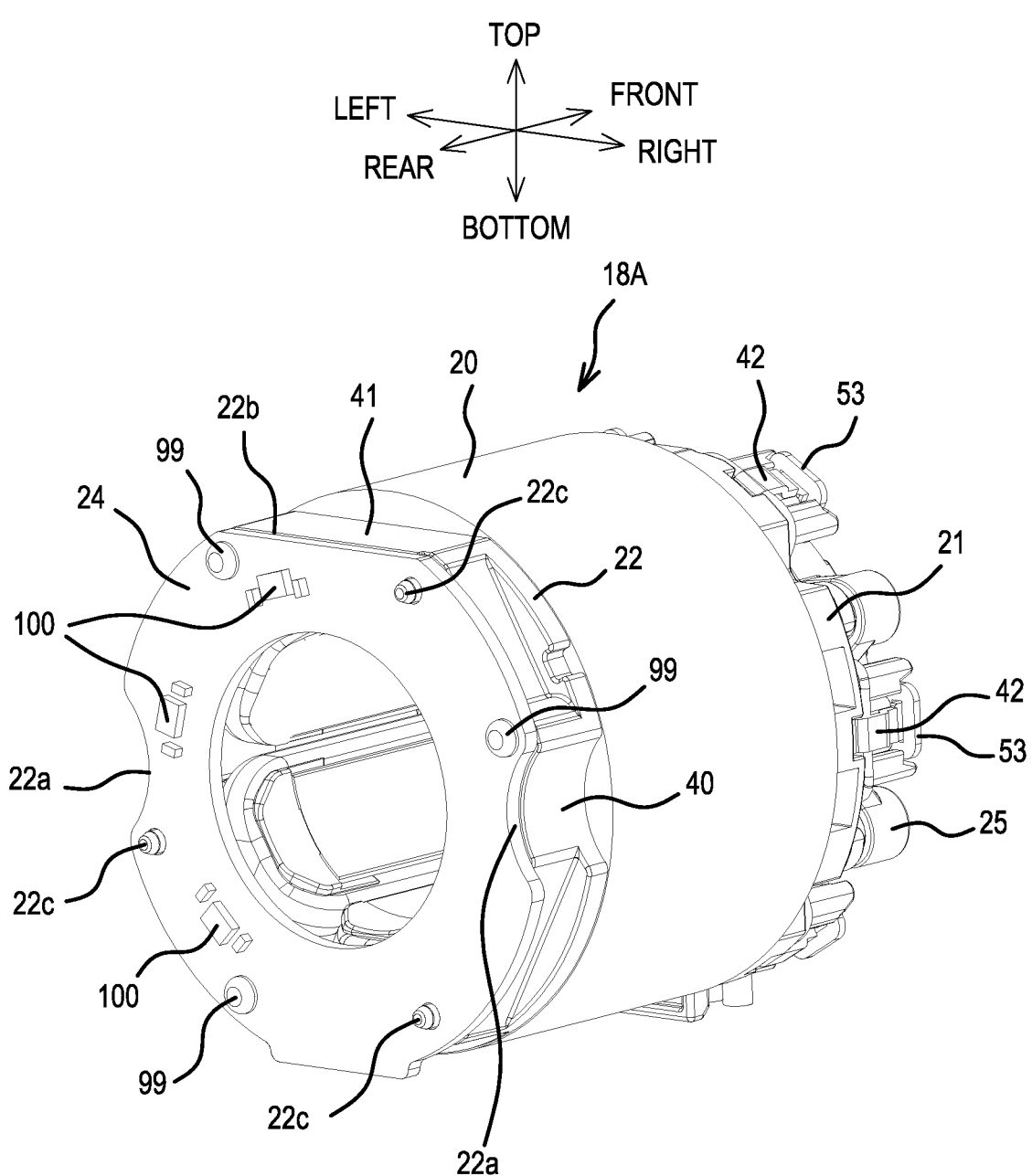
FIG. 19 is a perspective view of a stator, wherein the attachment position of the sensor circuit board has been changed (as compared to the attachment position shown in FIG. 3).
Figures 20A, 20B, 20C:
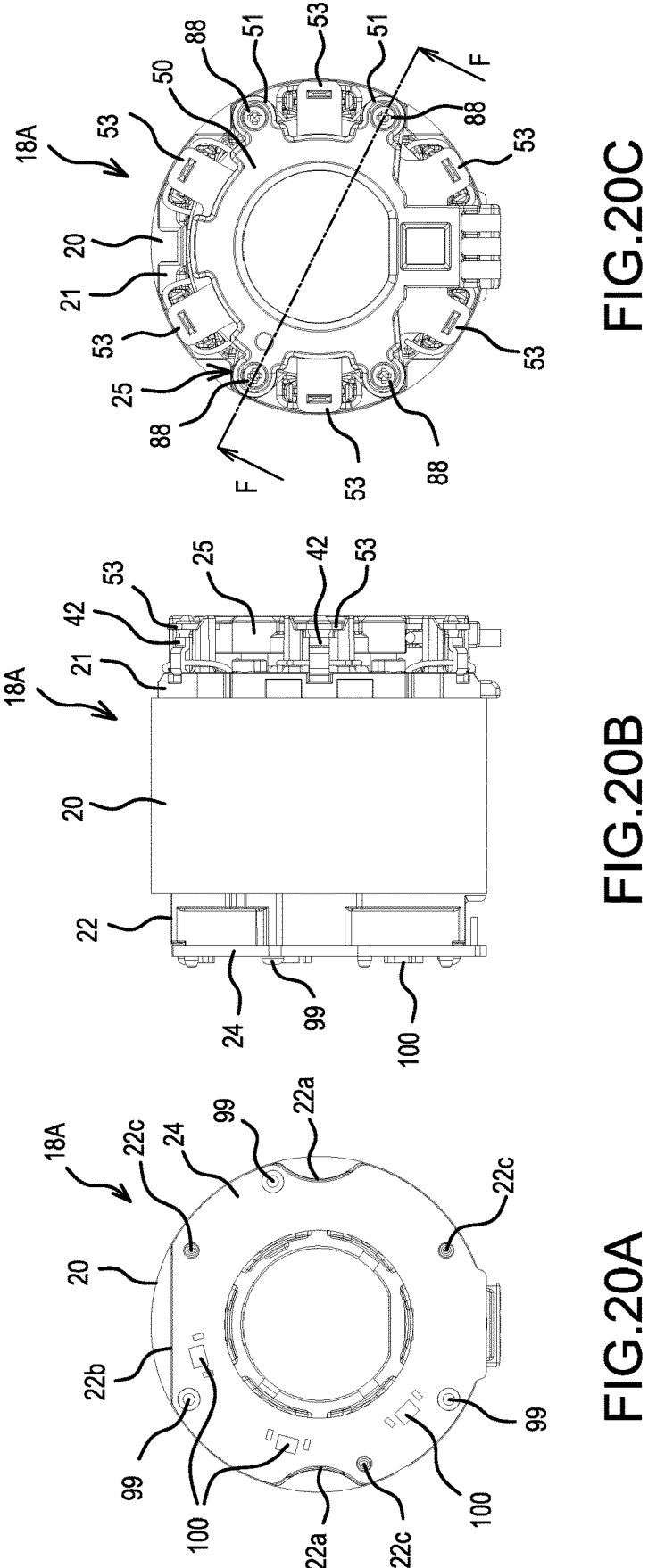
FIG. 20A is a rear view thereof.
FIG. 20B is a side view thereof.
FIG. 20C is a front view thereof.
Figure 21:
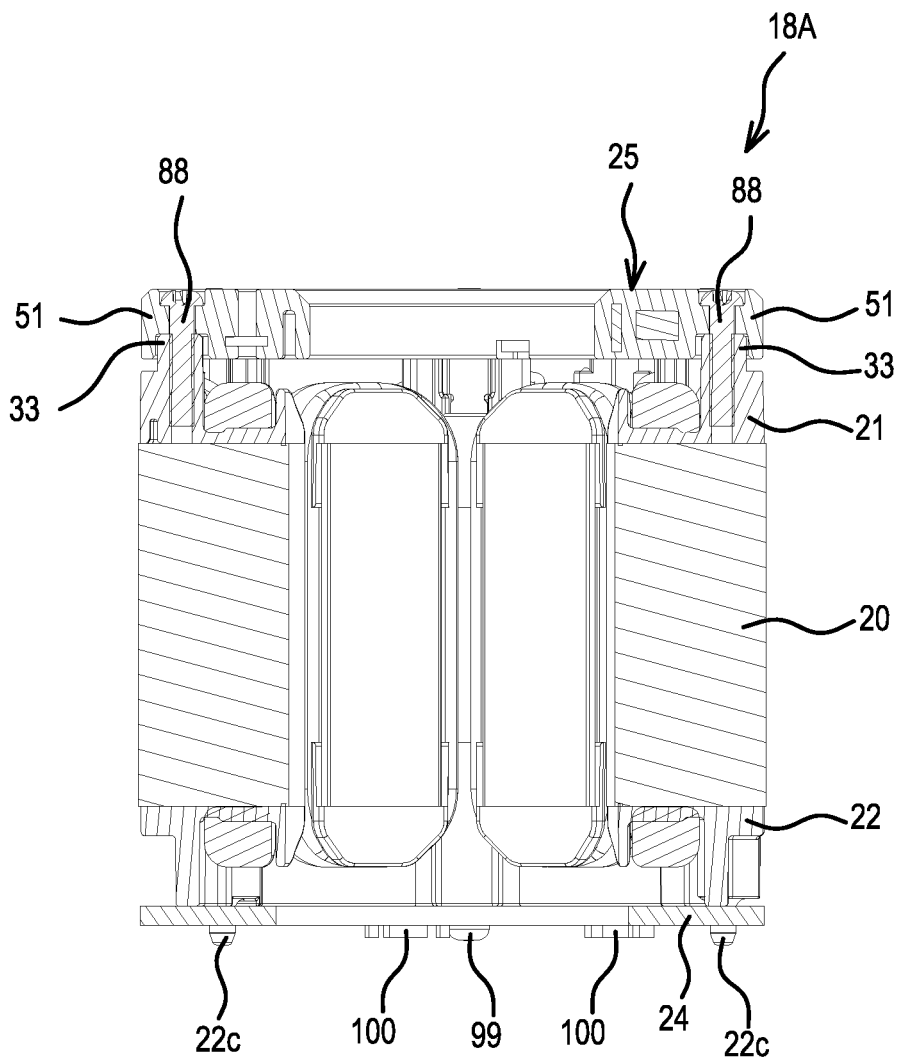
FIG. 21 is a cross sectional view taken along the F-F line in FIG. 20C.

Furthermore, the sensor circuit board 24 can also be provided on the side of the stator core 20 opposite the short circuiting element 25. That is, in an alternative embodiment of a stator 18A as shown in FIGS. 19-21, the sensor circuit board 24 is provided on the rear surface of the rear insulator 22, and therefore transverse notched parts 22a and a chamfer part 22b are formed, in accordance with the transverse notched parts 40 and the chamfer part 41 provided on the rear insulator 22, on the outer circumference of the sensor circuit board 24, which makes it possible to also assemble the stator 18A in a tubular housing. Reference numbers 99 are screws, and reference numbers 100 are rotation detection devices (Hall-effect ICs). In this embodiment, the positions of permanent magnets provided on the centrifugal fan 65 are detected by the rotation detection devices 100. In the present design, the short circuiting element 25 is assembled in the front insulator 21 without transiting the sensor circuit board 24. However, because the short circuiting element 25 mates and seats the recessed parts on the rear surface sides of the bosses 51 to and in the upper surfaces of the screw bosses 33 of the front insulator 21, the position of the short circuiting element 25 does not change even without the sensor circuit board 24. The short circuiting element 25 is positioned by the mating of the recesses and protrusions between the screw bosses 33 and the bosses 51. In FIG. 19, a plurality of projections 22c integrally project from the rear surface of the rear insulator 22, and the sensor circuit board 24 is retained by inserting the projections in through holes provided in the sensor circuit board 24 and then thermally deforming the projections.

Figure 22B:
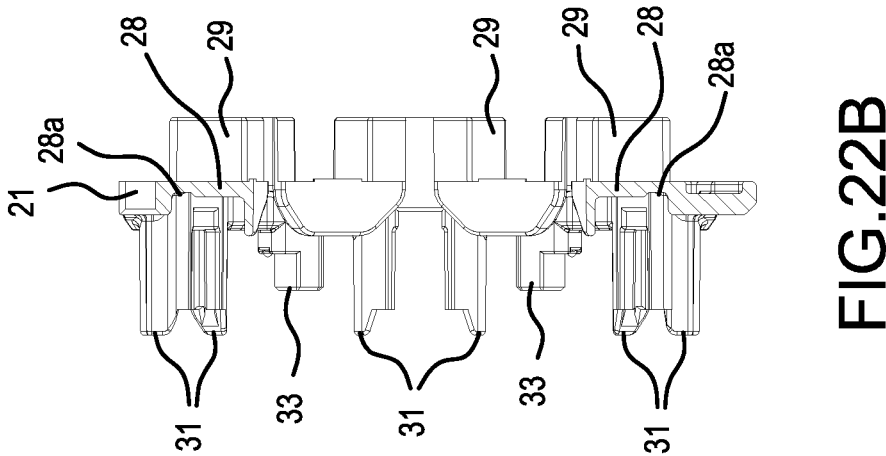
FIG. 22B is a cross sectional view taken along the G-G line in FIG. 22A.
Figure 22A:
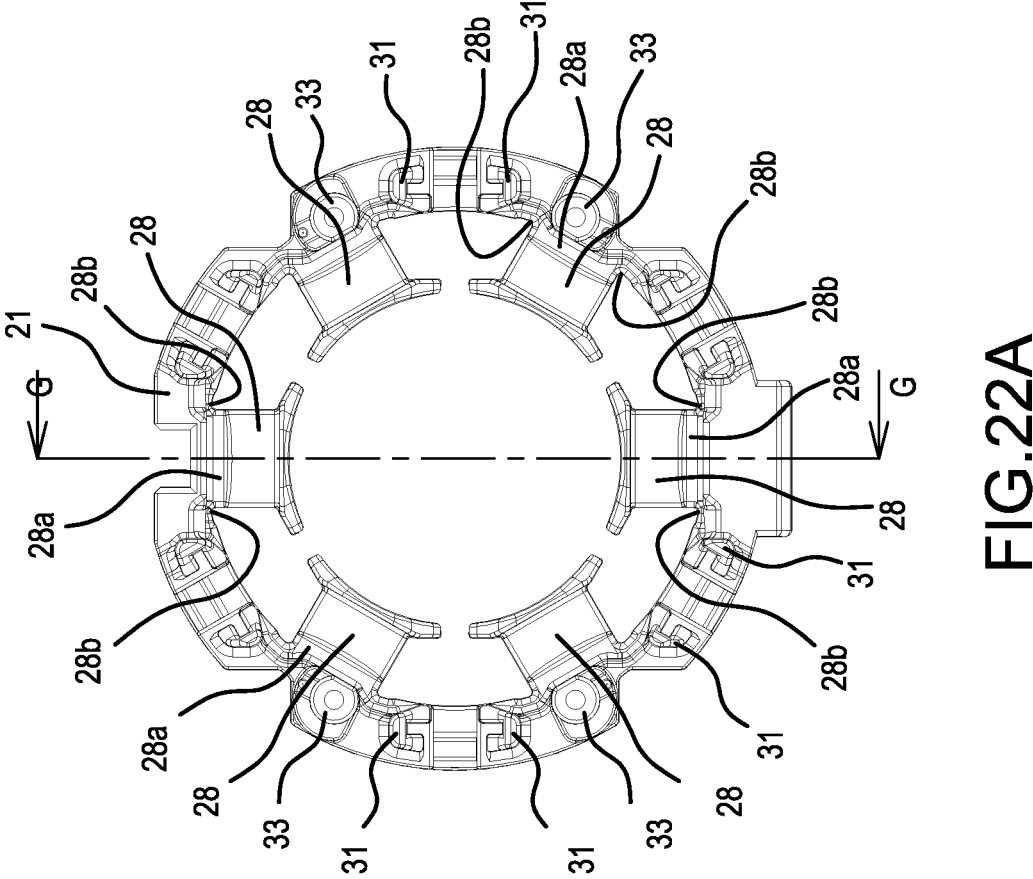
FIG. 22A is a front view thereof.
Figure 23B:
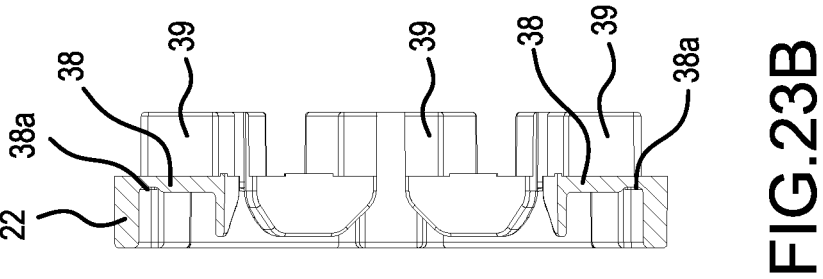
FIG. 23B is a cross sectional view taken along the H-H line in FIG. 23A.
Figure 23A:
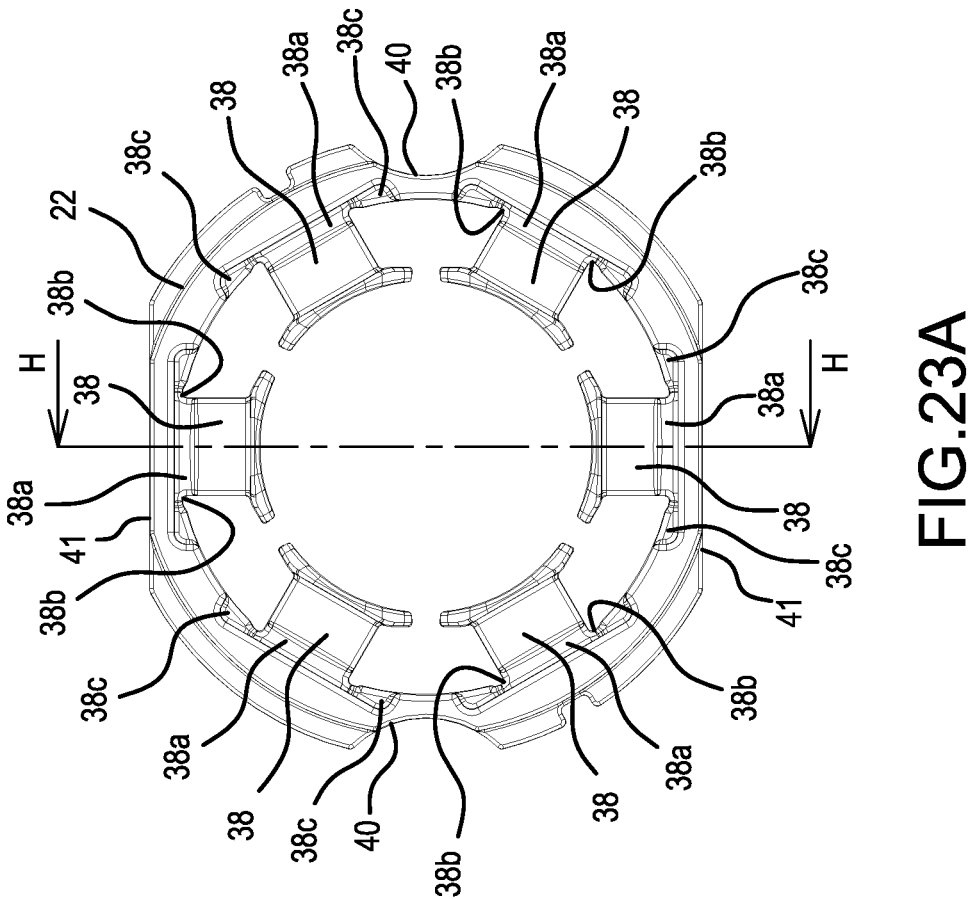
FIG. 23A is a front view thereof.

Moreover, the structures of the insulators also can be modified if necessary. FIGS. 22A and B show a modified example of the front insulator 21, and FIGS. 23A and B show a modified example of the rear insulator 22. As shown in FIGS. 22A and B, recessed grooves 28a are formed in the front insulator 21, in directions orthogonal to the protruding parts 28, on the front surface sides of the bases of the protruding parts 28. In addition, relief parts 28b, 28b, which are recessed in the radial directions, are formed on both sides in the circumferential direction of the bases of the protruding parts 28. Likewise, as shown in FIGS. 23A and B, recessed grooves 38a are also formed in the rear insulator 22, in directions orthogonal to the protruding parts 38, on the rear surface sides of the bases of the protruding parts 38. In addition, relief parts 38b, 38b, which are recessed in the radial directions, are formed on both sides in the circumferential direction of the bases of the protruding parts 38.

Each one of the winding wires of the coils 23 in the teeth 26 starts its winding by being fitted in the recessed grooves 28a, 38a, such that the coil of the first winding is held exactly at the base of one of the teeth, and the coils of the second and subsequent windings are successively wound in series around the respective bases of the circumferentially adjacent teeth.

In addition, a nozzle for winding the coils 23 easily passes through the relief parts 28b, 38b. Furthermore, hollow parts 38c for smoothly winding the coils 23 are also formed on both sides of the bases of the protruding parts 38 on the inner circumferential surface of the rear insulator 22.

Figure 24:
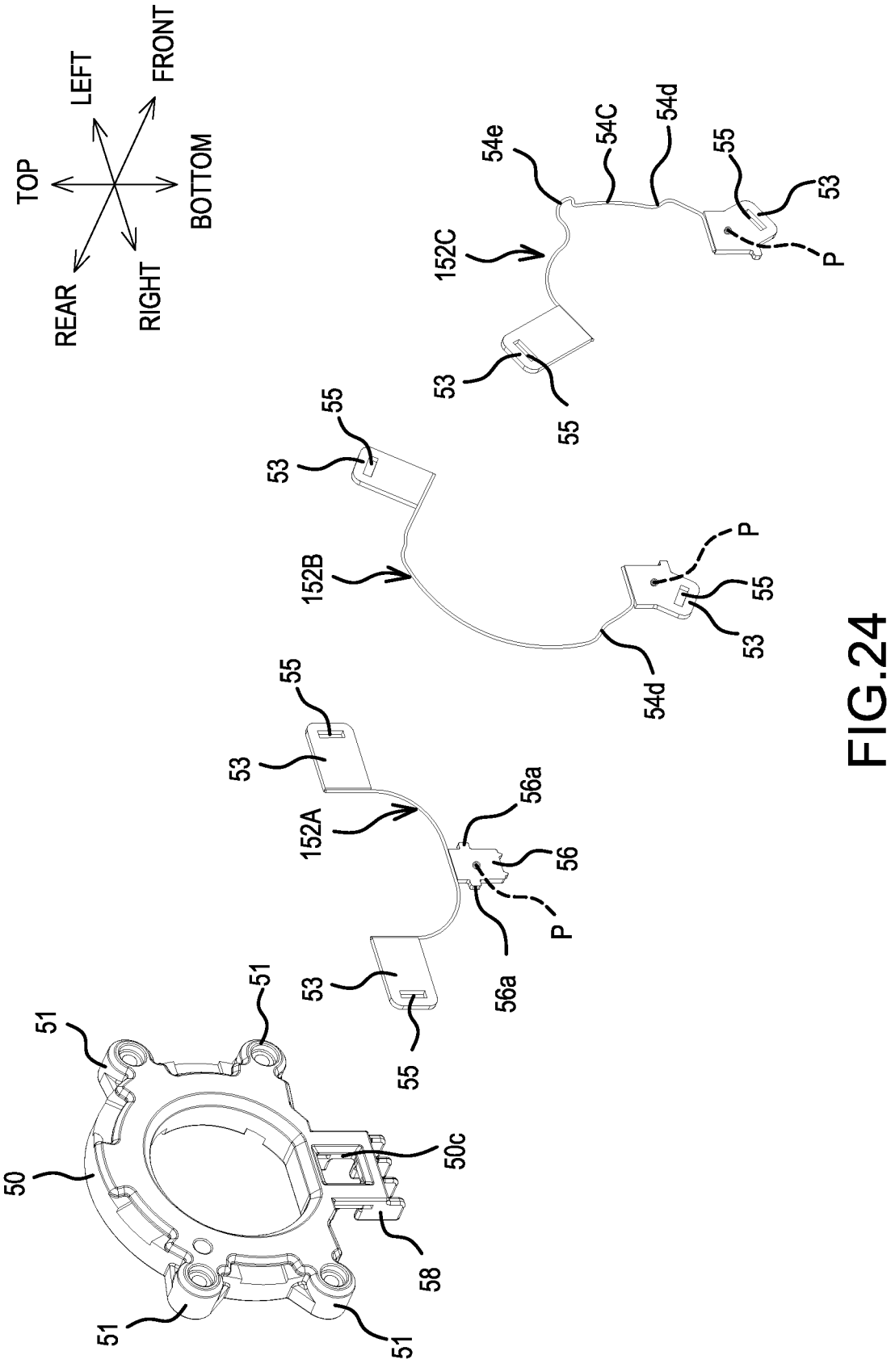
FIG. 24 is an exploded perspective view of a short circuiting element according to another embodiment of the present teachings.

Furthermore, in the above-described embodiments, the short circuiting means comprises the short circuiting element(s) and the fusing terminals; however, it is also possible, for example: to omit the fusing terminals and to short circuit (electrically connect or shunt) the winding wires with just the short circuiting element(s); conversely, it is also possible to omit the short circuiting element(s) and to interconnect the fusing terminals with wires 152A, 152B, 152C as shown in FIG. 24.

In addition, the power tool is not limited to a type that drives a tool accessory, such as a driver-drill, a circular saw, or a grinder, and the present invention can also be adapted, for example and without limitation, to vacuum cleaners and, furthermore, to gardening tools such as a blower. In addition, the present invention can also be adapted to power tools that use a sensor-less brushless motor and therefore have no sensor circuit board.

As used herein, the term "short circuit" is generally intended to mean a low resistance electrical connection such as a metal plate material or metal wire material. Preferably, no additional resistive element (e.g., a ceramic resistor) is added to the short circuit electrical path, but it is sufficient if the short circuit acts, e.g., as a shunt, i.e. one or more small or low resistance elements may be added to the short circuit electrical path, if appropriate for the particular design. Although metal sheet (plate) elements were used in the above-described representative embodiments, the short circuit electrical connections may also be in the form of a wire (i.e. round or oval shapes) as long as the wire has a sufficient diameter (thickness) to handle the rated current that is expected to flow through it.

REFERENCE NUMBER LIST

1 Driver-drill
2 Main body
6 Main body housing
6a, 6b Housing halves
17 Brushless motor
18 Stator
19 Rotor
20 Stator core
21 Front insulator
22 Rear insulator
23 Coil 23a Winding wire
24 Sensor circuit board
25 Short circuiting element
28 Protruding part
30 Retaining part
31 Projection
35 Recessed part
36 First notched part
37 Second notched part
38 Protruding part
40 Transverse notched part
42 Fusing terminal
43 First edge part of fusing terminal 42
44 Second edge part of fusing terminal 42
49 Signal line
50 Insulation part
52A First sheet metal element
52B Second sheet metal element
52C Third sheet metal element
53 Short circuiting piece
54 Coupling part
57 Power supply line
61 Rotary shaft
63 Permanent magnet
81 Tubular housing
82 Receiving rib
83 Rotation stopping rib
84 Longitudinal rib
90 Grinder
91 Motor housing
100 Rotation detection devices (Hall-effect ICs)

We claim:

1. A power tool, comprising:
a housing including a first half housing joined to a second half housing at a joint, the housing further including an end cap attached to a rear end of the first half housing and a rear end of the second housing;
a stator mounted in the housing, the stator including a stator core formed from a plurality of laminated steel sheets and a plurality of coils and having a first end surface axially spaced from a second end surface;
a rotor including a rotor core and a permanent magnet mounted in the rotor core, the rotor core being supported by a rotary shaft having an axis of rotation extending in a front-rear direction;
a first insulator mounted at a first axial end surface of the stator core and a second insulator mounted at a second axial end surface of the stator core;
a planetary gear located forward of the rotor core and configured to be rotated by the rotor; and
a handle extending from the housing;
wherein:
the joint extends in the front-rear direction,
the first insulator includes a pair of recesses,
each of the pair of recesses is covered by a portion of the stator core,
a pair of projections extend from the first half housing, and
the pair of projections are respectively mated with the pair of recesses.
2. The power tool according to claim 1, further comprising:
a sensor circuit board, and
a rotation detection device mounted on the sensor circuit board and configured to detect a position of the permanent magnet, wherein the stator core is located between the first insulator and the sensor circuit board.
3. The power tool according to claim 1,
including a centrifugal fan,
wherein the stator core is located between the first insulator and the centrifugal fan.
4. The power tool according to claim 1, wherein:
the centrifugal fan is located rearward of the stator core, and
the sensor circuit board is located forward of the stator core.
5. A power tool, comprising:
a housing including a first half housing joined to a second half housing at a joint, the housing further including an end cap attached to a rear end of the first half housing and a rear end of the second housing;
a stator mounted in the housing, the stator including a stator core formed from a plurality of laminated steel sheets and a plurality of coils;
a rotor including a rotor core and a permanent magnet mounted in the rotor core, the rotor core being supported by a rotary shaft having an axis of rotation extending in a front-rear direction;
a front insulator mounted at a front axial end of the stator core;
a rear insulator mounted at a rear axial end of the stator core;
a planetary gear located frontward of the rotor core and configured to be rotated by the rotor; and
a handle extending from the housing;
wherein:
the joint extends in the front-rear direction,
the front insulator includes a first recess and a second recess, a first portion of each of the first and second recesses opening at a radially outer side of the front insulator and a second portion of each of the first and second recesses opening axially rearward,
a first portion of the stator core covers the second portion of the first recess and a second portion of the stator core covers the second portion of the second recess,
a first projection and a second projection extend from the housing, and
the first projection is mated with the first recess and the second projection is mated with the second recess.
6. The power tool according to claim 5, wherein:
a rear end of the rotary shaft is rotatably supported by a bearing,
the bearing is mounted in the end cap, and
a centrifugal fan is mounted on the rotor shaft at a location between the bearing and the rotor core.
7. The power tool according to claim 6, further comprising:
a trigger at a front of the handle;
a sensor circuit board; and
a rotation detection device mounted on the sensor circuit board and configured to detect a position of the permanent magnet;
wherein:
a signal line extends away from the sensor circuit board in a direction perpendicular to the front-rear direction,
a short circuiting piece is electrically connected to the coils, and
a power supply line extends from the short circuiting piece in the direction perpendicular to the front-rear direction.
8. The power tool according to claim 5, further comprising:

a trigger at a front of the handle;

a sensor circuit board; and a rotation detection device mounted on the sensor circuit board and configured to detect a position of the permanent magnet;

wherein:

a signal line extends away from the sensor circuit board in a direction perpendicular to the front-rear direction, a short circuiting piece is electrically connected to the coils, and a power supply line extends from the short circuiting piece in the direction perpendicular to the front-rear direction.

9. The power tool according to claim 5, wherein:

the first recess and the second recess each include a first surface circumferentially spaced from a second surface and a front surface extending from the first surface to the second surface, and a first portion of a front surface of the stator core opposes the front surface of the first recess and a second portion of the front surface of the stator core opposes the front surface of the second recess.

10. A power tool, comprising:

a housing including a first half housing joined to a second half housing at a joint, the housing further including an end cap attached to a rear end of the first half housing and a rear end of the second housing;

a stator mounted in the housing, the stator including a stator core formed from a plurality of laminated steel sheets and a plurality of coils and having a first end surface axially spaced from a second end surface;

a rotor including a rotor core and a permanent magnet mounted in the rotor core, the rotor core being supported by a rotary shaft having an axis of rotation extending in a front-rear direction;

a first insulator mounted at the first end surface of the stator core and a second insulator mounted at the second end surface of the stator core;

a planetary gear located forward of the rotor core and configured to be rotated by the rotor; and a handle extending from the housing;

wherein:

the joint extends in the front-rear direction of the power tool, the first insulator includes a first recess and a second recess, a first portion of each of the first and second recesses opening at a radially outer side of the first insulator and a second portion of each of the first and second recesses opening axially rearward, each of the first and second recesses includes a first side surface circumferentially spaced from a second side surface and an axially facing surface extending from the first side surface to the second side surface, portions of the first end surface of the stator core oppose the axially facing surfaces, a first projection and a second projection extend from the first half housing or the second half housing, and the first projection is mated with the first recess and the second projection is mated with the second recess.

* * * * *